US011263751B2

(12) United States Patent
Saha et al.

(10) Patent No.: US 11,263,751 B2
(45) Date of Patent: Mar. 1, 2022

(54) METHOD AND APPARATUS FOR IMAGE SEGMENTATION USING AN EVENT SENSOR

(71) Applicant: Samsung Electronics Co., Ltd., Suwon-si (KR)

(72) Inventors: Sujoy Saha, Bangalore (IN); Karthik Srinivasan, Bangalore (IN); Sourabh Singh Yadav, Bangalore (IN); Suhas Shantaraja Palasamudram, Bangalore (IN); Venkat Ramana Peddigari, Bangalore (IN); Pradeep Kumar Sk, Bangalore (IN); Pranav P Deshpande, Bangalore (IN); Akankshya Kar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 16/666,225

(22) Filed: Oct. 28, 2019

(65) Prior Publication Data

US 2020/0134827 A1    Apr. 30, 2020

(30) Foreign Application Priority Data

Oct. 26, 2018 (IN) .............................. 201841040539
Sep. 23, 2019 (IN) .............................. 201841040539

(51) Int. Cl.
  *G06T 7/11* (2017.01)
  *G06K 9/00* (2006.01)
  (Continued)

(52) U.S. Cl.
  CPC ............... *G06T 7/11* (2017.01); *G06K 9/628* (2013.01); *G06T 7/248* (2017.01); *G06V 20/56* (2022.01);
  (Continued)

(58) Field of Classification Search
  CPC . G06T 2207/30252; G06T 2207/10144; G06T 2207/10024; G06T 7/248; G06T 7/11; G06K 9/628; G06K 9/00791
  See application file for complete search history.

(56) References Cited

U.S. PATENT DOCUMENTS 6,515,275 B1 * 2/2003 Hunter ................. H04N 9/0451
                                                250/226
6,731,799 B1 * 5/2004 Sun ......................... G06T 7/246
                                                382/173
(Continued)

OTHER PUBLICATIONS

International Search Report and Written Opinion of the International Searching Authority in connection with International Application No. PCT/KR2019/014277 dated Feb. 5, 2020, 10 pages.
(Continued)

*Primary Examiner* — Mia M Thomas

(57) ABSTRACT

A method for real-time semantic image segmentation using a monocular event-based sensor includes capturing a scene using a red, green, blue (RGB) sensor to obtain a plurality of RGB frames and an event sensor to obtain event data corresponding to each of the plurality of RGB frames, performing object labeling for objects in a first RGB frame among the plurality of RGB frames by identifying one or more object classes, obtaining an event velocity of the scene by fusing the event data corresponding to the first RGB frame and at least one subsequent RGB frame among the plurality of RGB frames, determining whether the event velocity is greater than a predefined threshold, and performing object labeling for objects in the at least one subsequent RGB frame based on the determination.

17 Claims, 30 Drawing Sheets

(51) Int. Cl.
*G06K 9/62* (2006.01)
*G06T 7/246* (2017.01)
*G06V 20/56* (2022.01)

(52) U.S. Cl.
CPC ............... *G06T 2207/10024* (2013.01); *G06T 2207/10144* (2013.01); *G06T 2207/30252* (2013.01)

(56) References Cited

U.S. PATENT DOCUMENTS

| | | | | |
|---|---|---|---|---|
| 10,475,206 | B1* | 11/2019 | Rush | G06V 20/52 |
| 10,699,421 | B1* | 6/2020 | Cherevatsky | H04N 7/181 |
| 2003/0235341 | A1* | 12/2003 | Gokturk | G06T 9/001 |
| | | | | 382/243 |
| 2008/0024612 | A1* | 1/2008 | Oya | G11B 27/105 |
| | | | | 348/207.1 |
| 2009/0016643 | A1* | 1/2009 | Johnson | G06T 7/90 |
| | | | | 382/282 |
| 2011/0142283 | A1* | 6/2011 | Huang | G06T 7/215 |
| | | | | 382/103 |
| 2013/0321564 | A1* | 12/2013 | Smith | G06T 17/00 |
| | | | | 348/14.08 |
| 2014/0168421 | A1* | 6/2014 | Xu | G01J 3/36 |
| | | | | 348/135 |
| 2015/0062351 | A1* | 3/2015 | Heinzle | H04N 5/2258 |
| | | | | 348/187 |
| 2015/0063681 | A1* | 3/2015 | Bhardwaj | G06K 9/00208 |
| | | | | 382/154 |
| 2015/0206312 | A1* | 7/2015 | Luo | G06T 7/194 |
| | | | | 382/173 |
| 2015/0374263 | A1* | 12/2015 | Kuramoto | A61B 5/1032 |
| | | | | 600/477 |
| 2016/0110868 | A1* | 4/2016 | Cheng | G06K 9/6267 |
| | | | | 382/128 |
| 2016/0280229 | A1* | 9/2016 | Kasahara | H04N 5/2354 |
| 2016/0300361 | A1* | 10/2016 | Xie | G06N 20/00 |
| 2016/0366346 | A1* | 12/2016 | Shin | G06K 9/00771 |
| 2017/0006211 | A1* | 1/2017 | Gurbuz | H04N 5/2226 |
| 2017/0086712 | A1* | 3/2017 | Mauro | A61B 5/1101 |
| 2017/0124717 | A1* | 5/2017 | Baruch | G06T 7/194 |
| 2017/0295355 | A1* | 10/2017 | Tanaka | H04N 13/128 |
| 2018/0150701 | A1* | 5/2018 | Kang | G06K 9/78 |
| 2018/0275242 | A1* | 9/2018 | Peri | G06F 3/0346 |
| 2019/0279379 | A1* | 9/2019 | Srinivasan | G06T 7/50 |
| 2020/0265600 | A1* | 8/2020 | Oh | G06T 7/60 |
| 2020/0273176 | A1* | 8/2020 | Takeda | G06T 7/194 |

OTHER PUBLICATIONS

Supplementary European Search Report dated Oct. 28, 2021, in connection with European Application No. 19875347.7, 6 pages.

Stauffer, et al., "Adaptive background mixture models for real-time tracking," Proceedings of the 1999 IEEE Computer Society Conference on Computer Vision and Pattern Recognition, IEEE, 1999, 7 pages.

* cited by examiner

RGB based Semantic Segmentation    Classification

Comparison of frames at timestamps t and t+10 in two video sequences

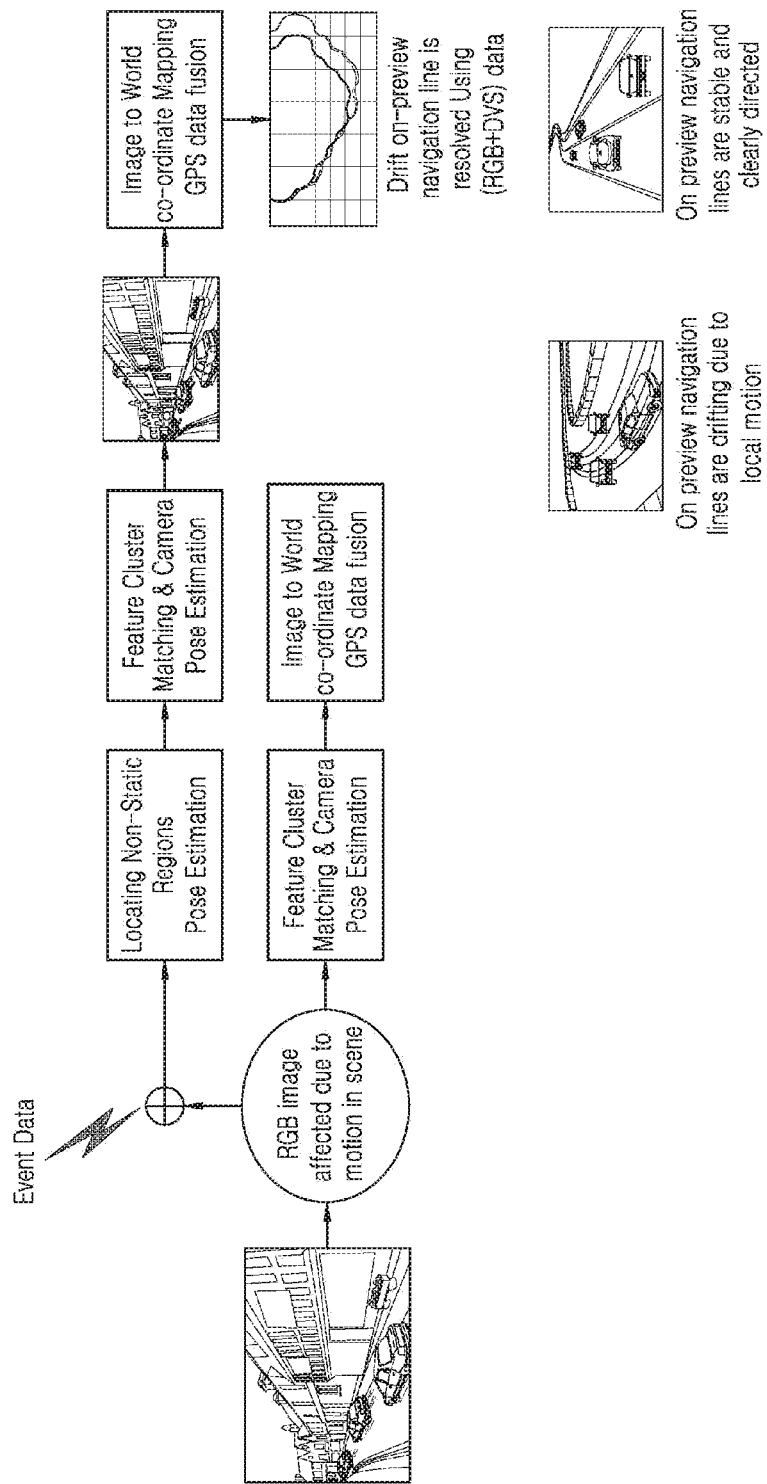

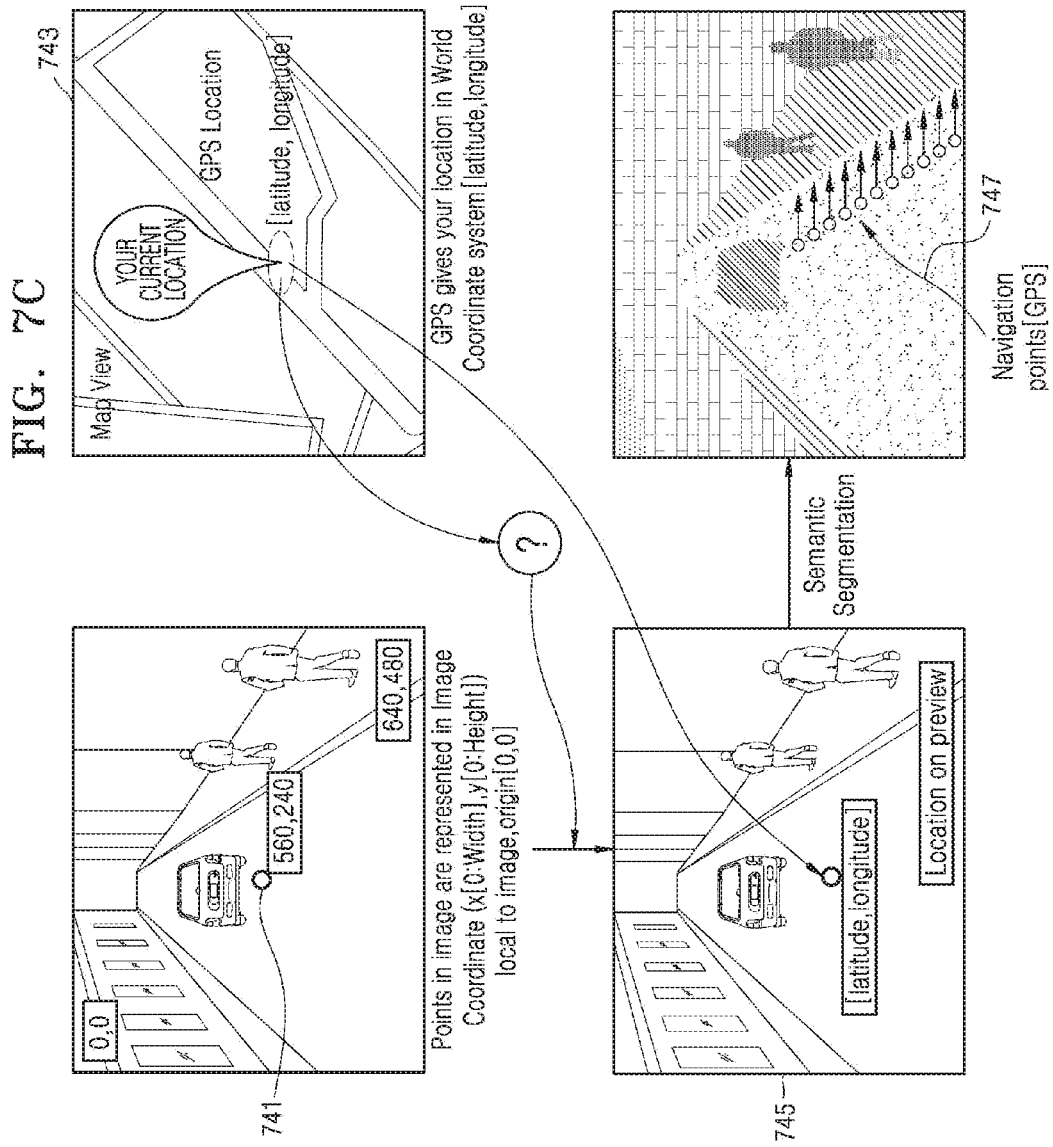

FIG. 10D generating the event data of the scene
at a plurality of sensitivity levels by — 1030
changing exposure values of the event sensor

METHOD AND APPARATUS FOR IMAGE SEGMENTATION USING AN EVENT SENSOR

CROSS-REFERENCE TO RELATED APPLICATION

This application is based on and claims priority under 35 U.S.C. § 119 to Indian Provisional Application No. 201841040539 (PS), which was filed in the Indian Intellectual Property Office on Oct. 26, 2018, and Indian Complete Application No. 201841040539 (CS), which was filed in the Indian Intellectual Property Office filed on Sep. 23, 2019, the entire disclosure of each of which is incorporated herein by reference.

BACKGROUND

1. Field

The present disclosure relates to a field of media processing and more particularly to a method and an apparatus for real-time semantic image segmentation using an imaging capturing sensor.

2. Description of Related Art

It is very important to accurately determine the objects in a scene ahead in an autonomous vehicle. If the roadside shade is identified as an obstacle and the vehicle lane is changed or the vehicle is stopped, autonomous driving may not work properly. Therefore, in order to accurately determine the scene ahead of the autonomous vehicle, a solution for accurately determining objects in the scene with fast response is required.

SUMMARY

Accordingly, provided is a method for real-time semantic image segmentation using a sensor. The method includes capturing a scene using an RGB (Red, Green, and Blue) sensor and the monocular event-based sensor. The captured scene comprises at least one of, a plurality of RGB (Red, Green, and Blue) frames and event data. The method includes performing semantic labeling of a first RGB frame from the plurality of the RGB frames, generating an event velocity of the scene by correlating the event data corresponding to the first RGB frame and at least one subsequent RGB frame of the plurality of the RGB frames, determining whether the generated event velocity of the scene is greater than a pre-defined threshold, and performing the semantic labeling of the at least one subsequent RGB frame when the generated event velocity of the scene is greater than the pre-defined threshold.

Accordingly, provided is an apparatus for real-time semantic image segmentation using a monocular event-based sensor. The apparatus is configured to capture a scene using an RGB (Red, Green, and Blue) sensor and the monocular event-based sensor. The captured scene comprises at least one of, a plurality of RGB (Red, Green, and Blue) frames and event data. The apparatus is configured to perform semantic labeling of a first RGB frame from the plurality of the RGB frames. The apparatus is configured to generate an event velocity of the scene by correlating the event data corresponding to the first RGB frame and at least one subsequent RGB frame of the plurality of the RGB frames. The apparatus is configured to determine, whether the generated event velocity of the scene is greater than a pre-defined threshold. The apparatus is configured to perform the semantic labeling of the at least one subsequent RGB frame when the generated event velocity of the scene is greater than the pre-defined threshold.

Accordingly, provided is a method for image segmentation in an electronic device, the method including obtaining a first RGB frame of a scene using a sensor which comprises an RGB sensor generating RGB data and an event sensor generating event data corresponding to the first RGB frame, classifying objects in the scene to one or more classes by identifying the one or more classes of objects in the scene, obtaining event data corresponding to a second RGB frame with the event sensor, identifying motion information of the scene with the classified objects based on the first RGB frame and the event data of the second RGB frame, and updating an object boundary for the second RGB frame using the motion information.

Accordingly, provided is a method for image segmentation in an electronic device, the method including capturing a scene using an RGB sensor to obtain a plurality of RGB frames and an event sensor to obtain event data corresponding to each of the plurality of RGB frames, performing object labeling for objects in a first RGB frame among the plurality of RGB frames by identifying one or more object classes, obtaining an event velocity of the scene by fusing the event data corresponding to the first RGB frame and at least one subsequent RGB frame among the plurality of RGB frames, determining whether the event velocity is greater than a predefined threshold, and performing object labeling for objects in the at least one subsequent RGB frame based on the determination.

Provided is an apparatus for image segmentation, the apparatus including a sensor configured to obtain a first RGB frame of a scene, wherein the sensor comprises an RGB sensor used to generate RGB data and an event sensor used to generate event data of the first RGB frame and a second RGB frame; and a processor configured to classify objects in the scene to one or more classes by identifying the one or more classes of objects in the scene, identify motion information of the scene with the classified objects based on the first RGB frame and the event data of the second RGB frame, and update an object boundary for the second RGB frame using the motion information.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which:

FIG. 7A illustrates a flow diagram for handling local motion using RGB data and event data, according to an embodiment;

FIG. 7C illustrates the mapping of an image to world coordinate, according to an embodiment;

FIG. 10D illustrates a flow chart for obtaining the event data of the scene at a plurality of multiple sensitivity levels, according to an embodiment;

DETAILED DESCRIPTION

Figure 1A:
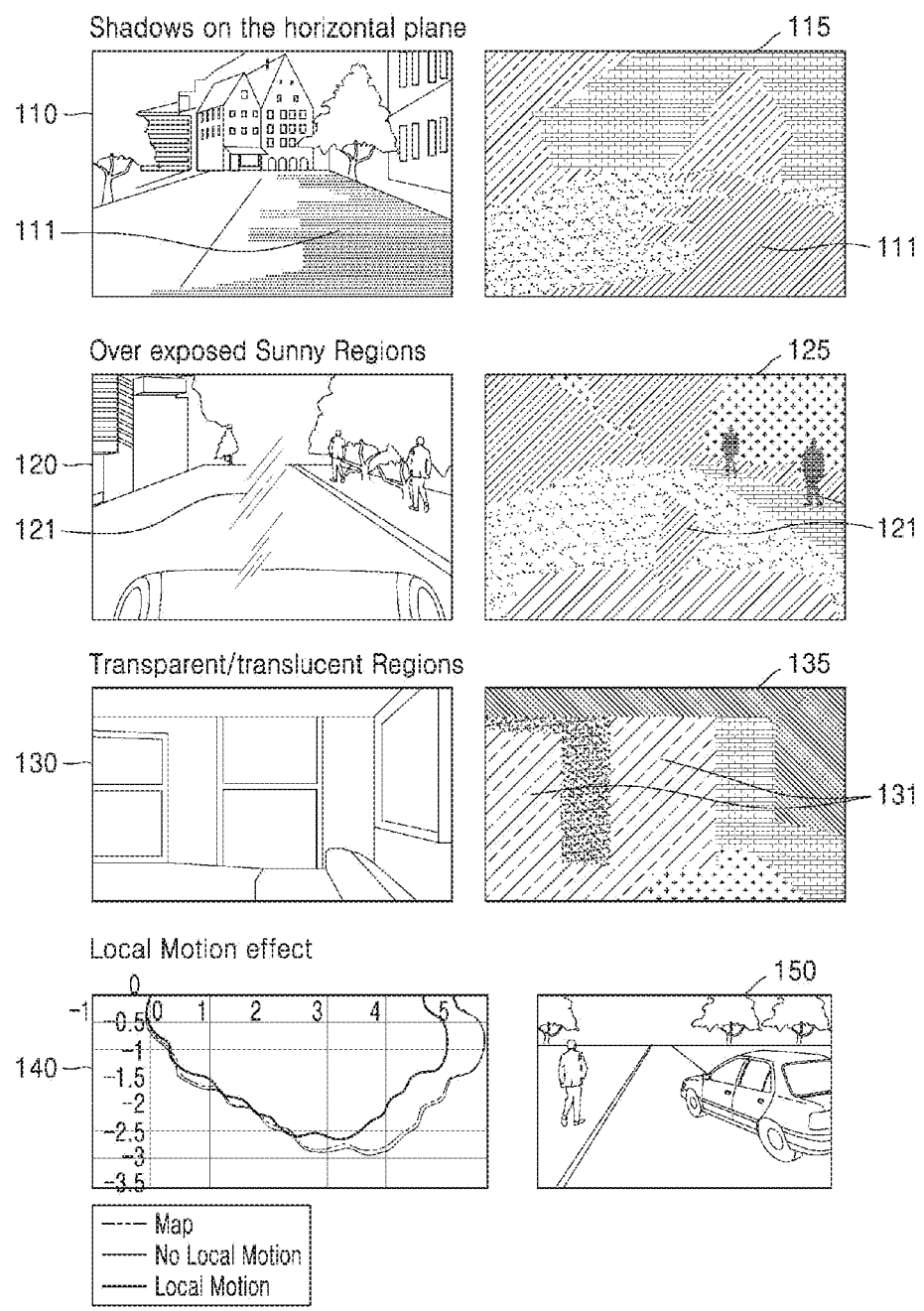
FIG. 1A illustrates example scenarios where semantic segmentation of a scene uses only RGB frames.

FIGS. 1A through 1I, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, modules, etc., are physically implemented by analog or digital circuits such as logic gates, integrated circuits, microprocessors, microcontrollers, memory circuits, passive electronic components, active electronic components, optical components, hardwired circuits, etc., and may optionally be driven by firmware and software. The circuits may be embodied in one or more semiconductor chips, or on substrate supports such as printed circuit boards. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc., may be used herein to describe various elements, these elements should not be limited by these terms. These terms are generally used to distinguish one element from another.

The embodiments herein achieve methods and apparatus for real-time semantic image segmentation using a sensor. The sensor may be a monocular event-based sensor. Referring now to the drawings, and more particularly to FIG. 2 through FIG. 11, where similar reference characters denote corresponding features consistently throughout the drawings, there are shown example embodiments.

In general, a segmentation of an image may be essential for image analysis tasks. Further, semantic segmentation may describe the process of associating each pixel of the image with a class label such as flower, person, road, sky, ocean, or car, and so on. Example applications for semantic segmentation include autonomous driving, self-driving vehicles, human-computer interaction, virtual reality, robot operation, navigation, Unmapped Aerial Vehicle (UAV), scene understanding, and so on. The semantic segmentation refers to the process of linking each pixel in an image to a class label. The class label could include a person, car, flower, piece of furniture, flower, road, sky, ocean, and so on.

Additionally, the semantic segmentation can be an image classification at a pixel level. For example, if an image has many cars, then the segmentation may label all the objects as a car. However, a separate class of models known as instance segmentation can be able to label the separate instances where an object appears in an image. This kind of segmentation can be very useful in applications that are used to count the number of objects such as counting the amount of foot traffic in a busy street. For example, semantic segmentation may be very crucial in self-driving cars and robotics because it may be important for the models (car or robot) to understand the context in the environment in which they are operating. Accordingly, selective delivery of content/multi-media may depend on whether the content is understood and appropriately indexed. If the content/multi-media is well understood, then the indexing is made available and a selective delivery can be accomplished using indices to select appropriate segments of content.

FIG. 1A illustrates example scenarios where semantic segmentation of a scene uses red, green, blue (RGB) frames. Referring to FIG. 1A, the event data 115, 125, 135 for each of the images 110, 120, 130 are shown.

Some shadow regions 111 on the road in image 110 may be erroneously classified as an object on the road. The automated driver assistant system (ADAS) may erroneously classify the shadowed region as an object on the road and the car may not move into the area where the shadow is due to the false classification.

Further, as shown in image 120, some of the regions on the road may be classified as an unknown class, due to sun glare in 121. The unknown class could be an obstacle/pothole or anything else. However, the ADAS may trigger to stop the car until human intervention. As shown in image 130, the RGB based semantic segmentation may fail to understand transparent regions 131 (such as a window), and the window can be misclassified as building/wall and so on. Conventional global pose estimation methods may have limitations in segregating local versus global motion of the camera that may lead to erroneous accumulation in camera pose estimation. Further, as shown in image 140, the navigation line may be altered due to the local motion effect. Pose estimation may be erroneous, due to the motion of other vehicles present on the road, while the user is approaching as shown in image 150, which may affect the Augmented Reality (AR) navigation experience.

Figure 1B:
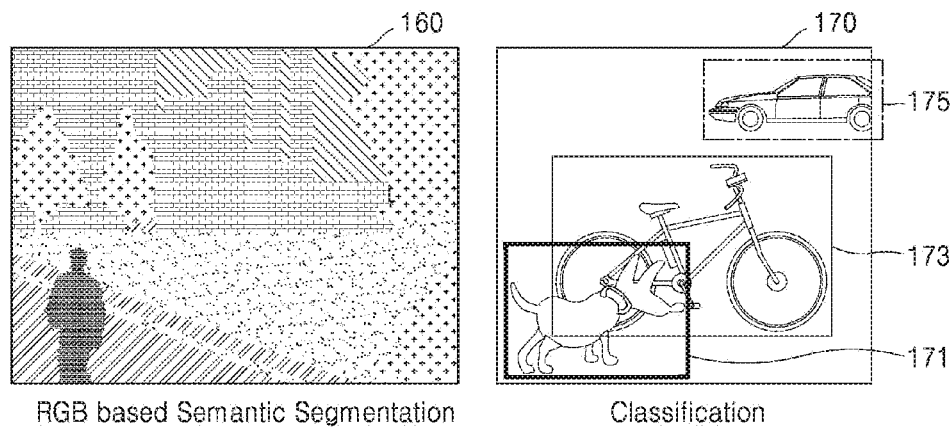
FIG. 1B illustrates RGB based semantic segmentation of a scene.
Figure 1B:
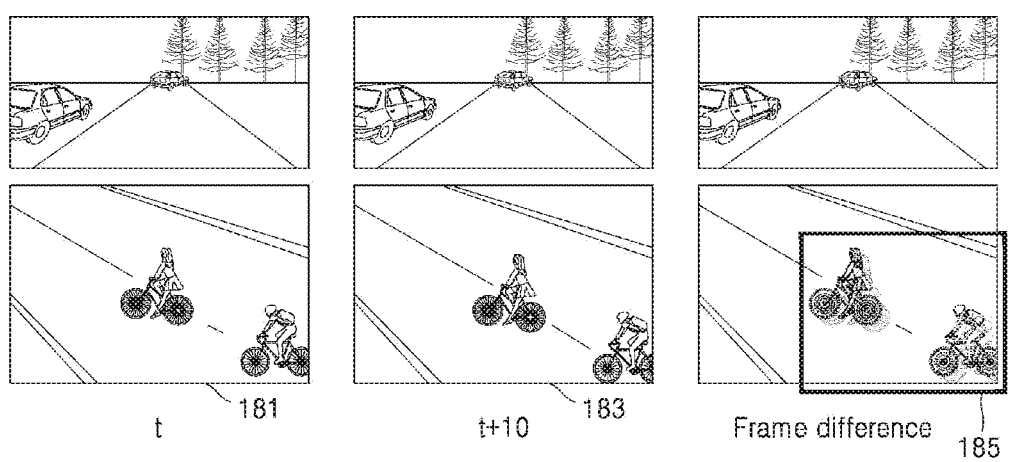

FIG. 1B illustrates RGB based semantic segmentation of a scene.

The semantic segmentation as shown in image 160 is a process of understanding or recognizing objects included in an image at a pixel level and assigning object class and/or class label(s) for each pixel in the image. The boundaries of each object or label may need to be delineated. Unlike object bounding box detection and classification (as depicted in box 171, box 173 and box 175 in image 170 of FIG. 1B), dense pixel-wise predictions may be required, and hence may be computationally intensive. Further, accurate semantic segmentation may enable a number of application(s) that may demand pixel-level precision for visual perception modules of respective application(s), such as autonomous vehicles, surveillance cameras, UAV, and so on.

Also, semantic segmentation of preview frame(s) can be crucial for upcoming Artificial Intelligence (AI) and Augmented Reality (AR) based solutions. Further, conventional methods disclose spatio-temporal redundancies for video semantic segmentation to support real-time use cases. As shown in FIG. 1B, optimization in video semantic segmentation may include finding accurate spatio-temporal changes and registering the accurate spatio-temporal changes over a sequence of RGB frames 181, 183 and 185. The video segmentation may be avoided using registered accurate spatio-temporal changes over the sequence of RGB frames 181, 183 and 185.

Figure 1C:
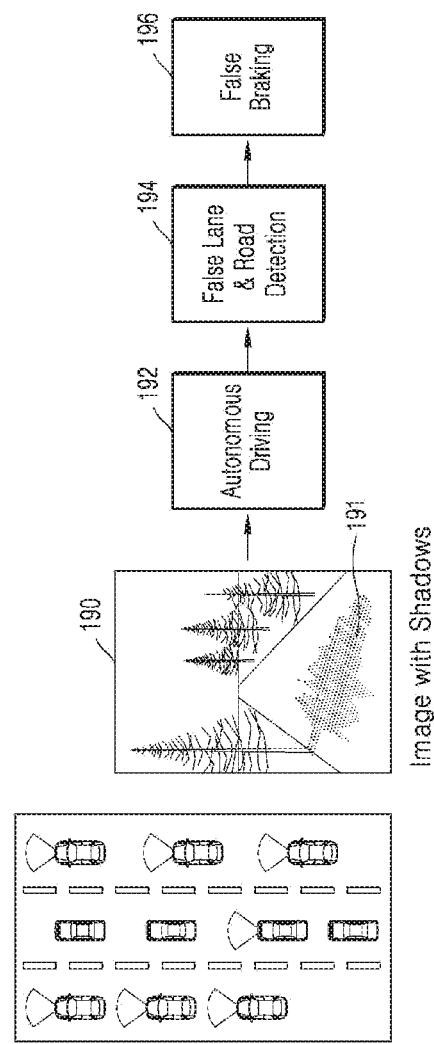
FIG. 1C illustrates an example of issue(s) caused by conventional semantic segmentation.

FIG. 1C illustrates an example of issue(s) caused with semantic segmentation if shadow 191 is in scene 190. In an example, the autonomous vehicles driven by autonomous driving in operation 192 may detect false lane and road in operation 194 due to the shadow 191 and thus slow down unexpectedly and brake unnecessarily in operation 196.

Figure 1D:
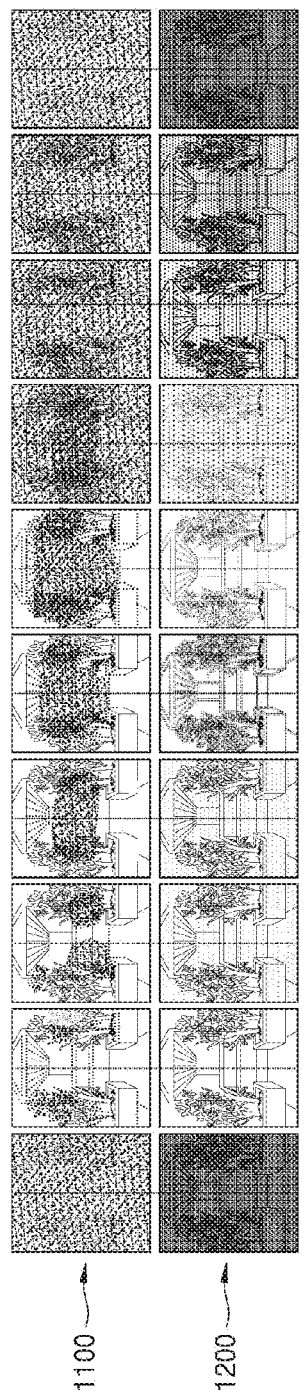
FIG. 1D illustrates an example where multi-sensitivity frames are captured using an event sensor.

FIG. 1D illustrates an example where multi-sensitivity frames are captured using an event sensor. Event data 1100 could be captured at different sensitivity levels by changing the exposure values of the sensor and then accumulating the feature map with accurate registration. Further, important features of the scene are captured at different sensitivity levels, in case of high dynamic ranges, low textured, and/or transparent images. As the event sensor may capture frame(s) at a very high rate over a significant duration of time, it may be possible to correlate event data 1100 with finer and deep level information with RGB frames (RGB data) 1200.

Additionally, systems such as camera system architecture for semantic segmentation may fail in very commonly occurring spatially inconsistent scenarios such as shadow regions, blown highlights, sun exposure, foggy area, low texture, transparent regions, and so on. These scenarios may bring about confusion to an image capturing device to understand the scene properly with conventional RGB (Red, Green, and Blue) sensors. Limitations may arise for the semantic segmentation methods that are using only RGB sensors.

Figure 2:
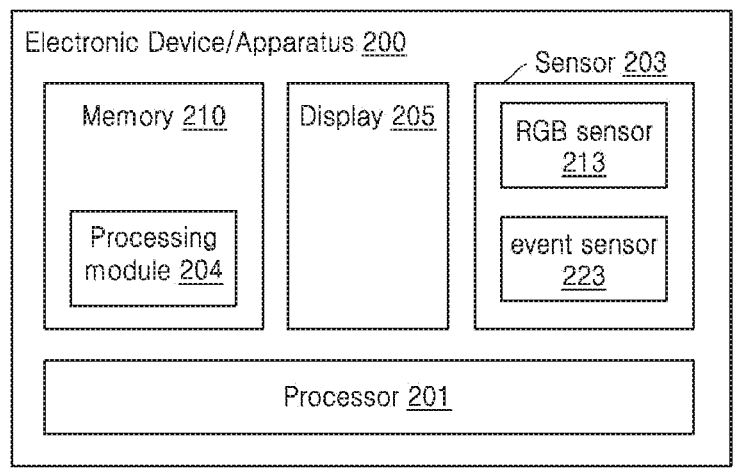
FIG. 2 illustrates an electronic device for real-time semantic image segmentation using a sensor, according to an embodiment.

FIG. 2 illustrates an electronic device 200 for real-time semantic image segmentation using a sensor, according to an embodiment.

The electronic device 200 may include a processor 201, a memory 210, a sensor 203, and a display 205. Further, the electronic device 200 may include a processing module 204 in the memory 210. When the machine-readable instructions are executed, the processing module 204 causes the electronic device 200 to process the data in a computing environment. Further, the electronic device 200 can also be referred herein to as an electronic device 200. Examples of the electronic device 200 can be, but not limited to, a mobile phone, a smart phone, a tablet, a handheld device, a phablet, a laptop, a computer, a wearable computing device, a server, an Internet of Things (IoT) device, a vehicle infotainment system, a autonomous vehicle, an Augmented Reality (AR) glasses, a robot, a unmanned drone, a camera, a web camera, a digital single-lens reflex (DSLR) camera, a video camera, a digital camera, a mirror-less camera, a still camera, and so on. The electronic device 200 may comprise other components such as input/output interface(s), communication interface(s) and so on (not shown). The electronic device 200 may comprise a user application interface (not shown), an application management framework (not shown) and an application framework (not shown) for real-time semantic image segmentation using a monocular event-based sensor. The application framework can be a software library that provides a fundamental structure to support the development of applications for a specific environment. The application framework may also be used in developing a graphical user interface (GUI) and web-based applications. Further, the application management framework may be responsible for the management and maintenance of the application and definition of the data structures used in databases and data files.

The electronic device 200 can operate as a standalone device or as a connected (e.g., networked) device that connects to other computer systems/devices. In a network environment, the electronic device 200 may operate as a server or client in a server-client network environment, or as a peer device in a peer-to-peer (or distributed) network environment. Further, the methods and apparatus described herein may be implemented on computing devices that host a plurality of cameras. Examples of these computing devices can be, but not limited to, mobile phones, tablets, cameras, wearable devices, personal computers, photo booths or kiosks, personal digital assistants, ultra-mobile personal computers, and mobile internet devices, autonomous vehicles, robots, drones and so on. Further, at least one of the cameras may include at least one of but not limited to, a Red Green Blue (RGB) sensor, a Dynamic Visual Sensor (DVS), a quadra sensor, and so on.

The electronic device 200 may detect a scene and capture a plurality of frames using the sensor 203. The optical media comprising the captured plurality of frames are converted into an electronic signal. In an embodiment herein, the structure of the electronic device 200 may further include an optical system (i.e. lens or image sensor), a photoelectric conversion system (i.e. charged coupled device (CCD), camera tube sensors, and so on.) and a circuitry (such as a video processing circuit). The color difference signals (U, V) may include a plurality of colors. In an example, consider that the color difference signals (U, V) may include two colors, which are represented by Cr and Cb. Cr reflects the difference between the red parts of the RGB signal values of the RGB input luminance signal. Cb signal reflects the blue part of the RGB input with the RGB values of the luminance difference signal. In an example, a dual-camera may comprise of two different image sensors such as at least one of, but not limited to, a Charge-Coupled Devices (CCD) sensor, an active pixel sensor, a Complementary Metal-Oxide-Semiconductor (CMOS) sensor, a N-type Metal-Oxide-Semiconductor (NMOS, Live MOS) sensor, a Bayer filter sensor, a quadra sensor, a tetra sensor, a Foveon sensor, a 3CCD sensor, a RGB (Red Green Blue) sensor, and so on. The electronic device 200 may activate certain sensors and deactivate other sensors. The camera residing in the electronic device 200 may include functions such as automatic focus (autofocus or AF), automatic white balance (AWB), and automatic exposure control (AEC) to produce pictures or video that are in focus, spectrally balanced, and exposed properly. AWB, AEC, and AF are referred to herein as 3A convergence.

In an embodiment, the electronic device 200 is configured to receive a plurality of frames of the scene captured using the RGB (Red, Green, and Blue) sensor 213 and the event sensor 223.

In an embodiment, the received plurality of frames comprises at least one of a plurality of RGB (Red, Green, and Blue) frames and an event data captured at multiple sensitivity levels. In an embodiment, the event data can be captured a higher frame rate that the RGB frames. In an embodiment, the electronic device 200 is configured to perform an object labeling of a first RGB frame from the received plurality of the RGB frames. The object labeling may be semantic labeling. Each pixel in the image may be assigned to an object class, also referred to as an object class labels and the boundaries of each object(s) may be delineated. Further, labels are assigned to the object(s), based on the object class (label) present in the scene. In an embodiment, the object labeling includes identifying at least one object class in the captured scene. In an example, an object class can be basic objects in the scene such as humans, bicycles, dogs, trees, cars, buildings and so on. That is, the objects in the scene may be classified based on their class such as humans, bicycle, dog, tree, car, buildings and so on.

In an embodiment, the electronic device 200 is configured to predict an object boundary (map) of at least one subsequent RGB frame from the received plurality of frames, using the identified at least one object class label present in the first RGB frame. Accordingly, the object boundary is predicted using the semantic label map generated in the first RGB frame. In an embodiment, the electronic device 200 is configured to generate an event velocity of the scene by correlating or fusing the received event data corresponding to the first RGB frame and at least one subsequent RGB frame of the plurality of the received RGB frames. The event data from the event sensor may be received asynchronously as compared to synchronous RGB data. Further, changes in the pixel intensity are received or detected as an event via the event sensor. The events are then accumulated over a period of time and are correlated or fused with the corresponding RGB frames. Further, the change in the accumulated events may be used to identify the motion information. In an embodiment, the electronic device 200 is configured to determine whether the generated event velocity of the scene is greater than a pre-defined threshold value. In an embodiment, the electronic device 200 is configured to perform the semantic labeling of the at least one subsequent RGB frame, when the generated event velocity of the scene is greater than the pre-defined threshold value. In an embodiment, the electronic device 200 is configured to update the predicted object boundary map of the subsequent RGB frame using the identified motion information of the scene. The event map data may be generated using the accumulated event data received at a high frame per second (fps) rate. The event-based object boundary may be computed using the event map data and is correlated or fused with the RGB frame. Further, based on the edge moments in the object boundary, the corresponding information in the RGB frame may be updated. The object boundary may be also referred to as an edge boundary.

In an embodiment, the event data obtained via the event sensor 223 may be asynchronously received to RGB data obtained via the RGB sensor 213. Further, any change in the pixel intensity may be received as an event via the event sensor 223. The received event(s) may be accumulated over a period of time and the events are correlated or fused with the corresponding RBG frames. The change in the accumulated events may be used to identify the motion information and may be used to generate an event velocity of the scene accordingly. In an embodiment, the event velocity of the scene comprises a measure of scene motion. In an embodiment, the electronic device 200 is configured to identify an number of changes of event velocity in the scene using the generated event velocity of the scene. In an embodiment, the electronic device 200 is configured to perform the semantic labeling of the subsequent RGB frame from the received plurality of frames, if the identified amount of change is greater than a pre-defined threshold value.

In an embodiment, the electronic device 200 is configured to identify at least one object class label in the captured scene, during the semantic labeling of the first RGB frame. Each pixel in the image may be assigned to an object class, also referred to as object class labels and the boundaries of each object(s) may be identified. Further, labels are assigned to the object(s), based on the object class label present in the scene. In an embodiment, the electronic device 200 may be configured to determine the boundaries of each object from the second frame captured in the scene. In an embodiment, the electronic device 200 is configured to retrieve event data corresponding to the first RGB frame and the subsequent RGB frame. The event data may be generated from the monocular event-based sensor and the received event data from the monocular event-based sensor can be asynchronous data. Further, a plurality of events may be generated for one RGB frame, and the events may be accumulated over a period of time. The event map may be generated with the accumulated events and then the event map may be correlated with the RGB frames. In an embodiment, the electronic device 200 is configured to derive the motion information of each object by correlating the event data of the first frame and the subsequent frames. In an embodiment, the electronic device 200 is configured to update the boundaries of each object in the subsequent RGB frame using the motion information. The event map may be generated using the accumulated event data received at a high frame per second (fps) rate. The event-based boundary may be computed using the event map and is correlated or fused with the RGB frames. In an embodiment, the electronic device 200 is configured to predict at least one object class label in the at least one subsequent RGB frame of the received plurality of frames, using the identified at least one object class label present in the first RGB frame. In an embodiment, the electronic device 200 is configured to update the predicted at least one object class label of the at least one subsequent RGB frame, using the generated event velocity of the scene.

In an embodiment, the electronic device 200 is configured to capture the event data at the multiple sensitivity levels of the event sensor. In an embodiment, the electronic device 200 is configured to change exposure value of the event sensor to extract one or more important features from the scene using accumulated event data captured between the first RGB frame and the at least one subsequent RGB frame. In an embodiment, the electronic device 200 is configured to correlate or fuse the event data including finer level information with the received plurality of RGB frames, by using a high frame rate event data accumulated over a significant duration of time. Further, the event data may be accumulated and may be applied to obtain or determine the optimum sensitivity level where spatially inconsistent regions such as shadows, transparent objects, and so on, can be differentiated or identified. In an embodiment, the electronic device 200 is configured to filter a class label given by semantic labeling of a first RGB frame for spatially inconsistent regions using multiple sensitivity levels of the received plurality of the event frames. In an embodiment, the electronic device 200 is configured to label a spatially inconsistent region of the filtered plurality of the frames. The spatially inconsistent region can be a sub-region within the frame that may trigger event changes due to changes in lighting conditions such as shadows but not due to an actual motion of the objects. In an embodiment, the electronic device 200 is configured to identify region propagation in the labeled plurality of the frames by observing the event changes in the spatially inconsistent region(s) at different sensitivity levels and by locating non-static regions and motion vector in spatially inconsistent regions such as shadow-like regions. For example, if the motion (a false motion) is detected due to a spatially inconsistent region such as shadow, the event changes may not be observed at all sensitivity levels and in turn helps in identifying the shadow as false motion of an object. In an embodiment, the electronic device 200 is configured to perform a temporal registration in the event map of the object boundary of the identified plurality of frames.

In an embodiment, the electronic device 200 is configured to identify a plurality of non-static regions in the scene using the event data. In an embodiment, the electronic device 200 is configured to mask a proximity motion region in the scene to avoid tracking of an erroneous feature—erroneous motion detection—in the scene. In an embodiment, the electronic device 200 is configured to correct the false motion detection in the predicted at least one object class labels for the at least one subsequent RGB frame, using the captured event data. In an embodiment, the electronic device 200 is configured to correct the misclassified spatially inconsistent regions in the semantically labeled image frame, using the registered event map. In an embodiment, the shadow region is masked in a semantically labeled image frame. In an embodiment, the electronic device 200 is configured to determine a temporal consistency of the identified at least one object class label in the first RGB frame and the at least one subsequent RGB frame. In an embodiment, the identified at least one object class label is determined to be temporally consistent if the generated event velocity is less than the pre-defined threshold. In an embodiment, the electronic device 200 may be configured to predict the at least one object class label in the subsequent frame without performing the semantic labeling of the subsequent frame, when the identified at least one object class label is determined to be temporally consistent.

In an embodiment, the electronic device 200 may be configured to perform at least one of a local motion error correction in the semantically labeled plurality of the RGB frames of the scene using the high frame rate event data. The local motion affects the class label of the important features in a given RGB frame due to non-static objects which appear within the scene for a short duration. In an embodiment, the electronic device 200 may be configured to mask the proximity motion region to avoid tracking of an erroneous feature such as shadow regions. The detected sparse event region(s) may be merged with the semantic label of the neighboring region. For example, the shadow region on the road would be merged with the class label having in the road region to avoid tracking of erroneous features as will be illustrated in detail referring to FIG. 8A.

In an embodiment, the event data are correlated accurately with pixel intensity data. In an embodiment, the event data correlated with the pixel intensity data includes deriving a registered edge boundary map and used for predicted boundary correction. In an embodiment, the edge boundary of objects in the scene may be registered based on the event data. In an embodiment, the temporal consistency is compared with the pre-defined threshold value to determine whether RGB data is required to perform the object class label predictions of the current frame or to proceed with event data. In an embodiment, labeling the sparse event region includes a segmentation boundary correction and a segmentation boundary smoothing, using the local motion correction method. For example, for use cases such as camera pose optimization and correction, a mapping of the location coordinate given by Global Positioning System (GPS) to the camera preview can be achieved in an enhanced manner.

Figure 3:
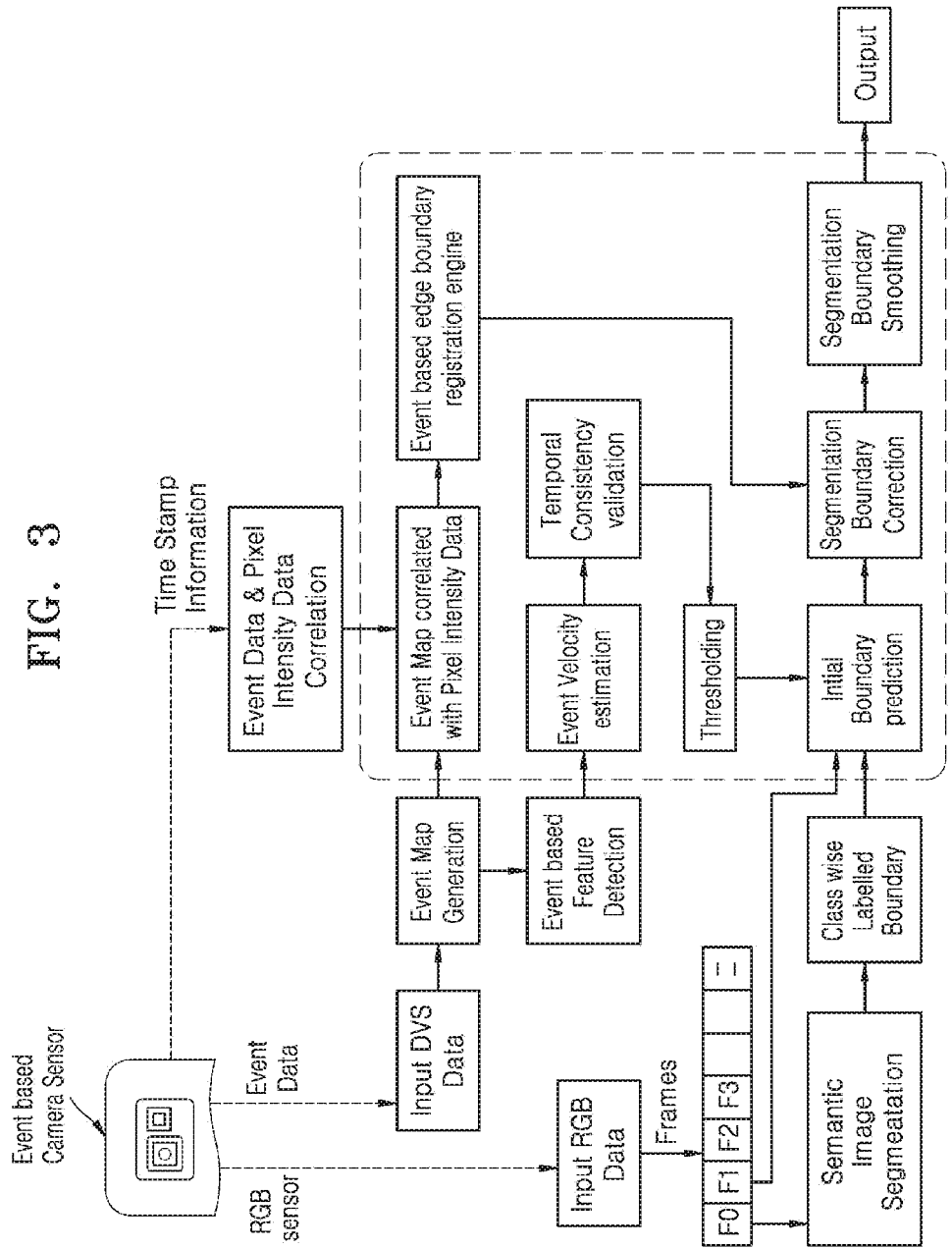
FIG. 3 illustrates a flow diagram for real-time semantic image segmentation using a sensor, according to an embodiment.

FIG. 3 illustrates a flow diagram for real-time semantic image segmentation using a sensor, according to an embodiment.

The key RGB frames are semantically labeled and used for semantic class boundary prediction in the subsequent frames. The RGB frame capturing rate can be very lower than the event frame capturing rate. Accordingly, event frames are correlated accurately with pixel intensity data.

The initially predicted semantic boundary maps may be further corrected/updated in the subsequent RGB frames using accumulated event maps generated from event frames captured with a high frame per second (fps) rate. The event velocity (motion component) may be calculated from the important features for understanding temporal consistency. The temporal consistency is compared with a pre-defined threshold value and is used to decide whether RGB information from the previous frame may be required to be used for object class label prediction of the current frame or may be possible to proceed with event data. For example, in autonomous driving applications, the temporal consistency would exceed the pre-defined threshold value when a pedestrian suddenly appears in front of the car. In this scenario, the event map generated from important features such as the pedestrian, in this case, results in a sudden change in the motion vector which is inconsistent with a gradual change in motion observed in previously accumulated event maps.

Figure 4A:
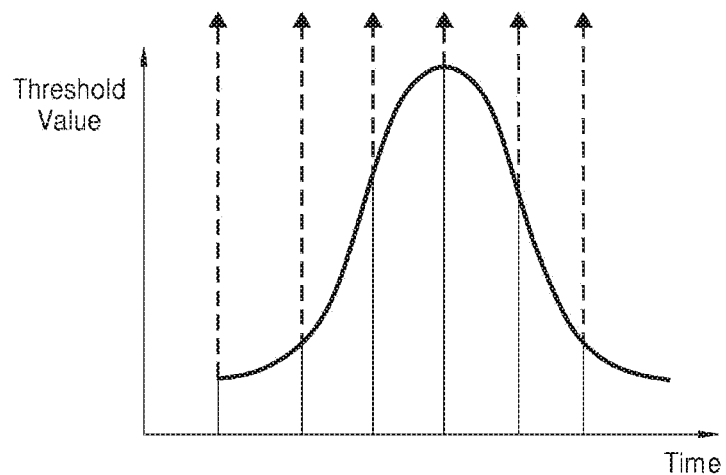
FIG. 4A illustrates a graph for multi-sensitivity DVS frames, according to an embodiment.

FIG. 4A illustrates a graph for multi-sensitivity DVS frames, according to embodiments as disclosed herein.

The DVS sensor may provide RGB data and DVS data via separate interfaces. The DVS sensor may be the event sensor 223 and the DVS data may be the event data in an embodiment. Further, a quantization block in the DVS sensor may compare the difference in pixel intensity and may determine whether the received frames are an event or not based on the pre-defined threshold value. The threshold value may be adjusted based on a pre-determined curve as depicted in FIG. 4A. Different DVS frames may be generated with various sensitivity levels where the DVS frames may also be referred to as event frames.

Figure 4B:
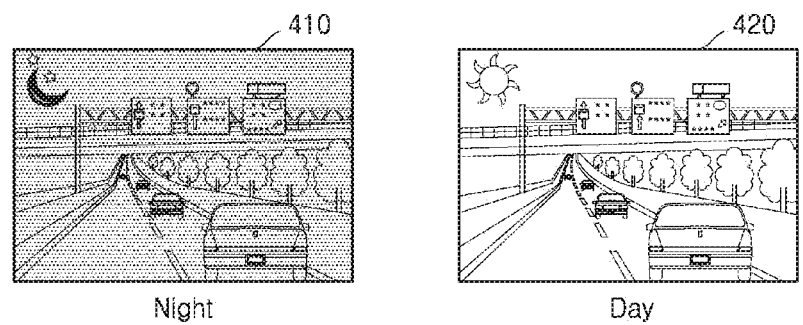
FIG. 4B illustrates an example diagram where a DVS sensitivity is calculated, according to an embodiment.

FIG. 4B illustrates an example schematic diagram where a DVS sensitivity is calculated, according to an embodiment.

In an example, in the day time, there can be extremely bright light around the autonomous car as shown in image 410. Hence, a wide range of sensitivity levels may be used to distinguish between sunlight and other objects (around 6-7 sensitivity levels). During night time in image 420, there can be good contrast between the environment and objects. Hence a narrow range of sensitivity levels may be enough to process semantic boundary correction (around 3-4 sensitivity levels). However, more DVS frames with a high sensitivity level may be used during the night in a low light environment.

Figure 5:
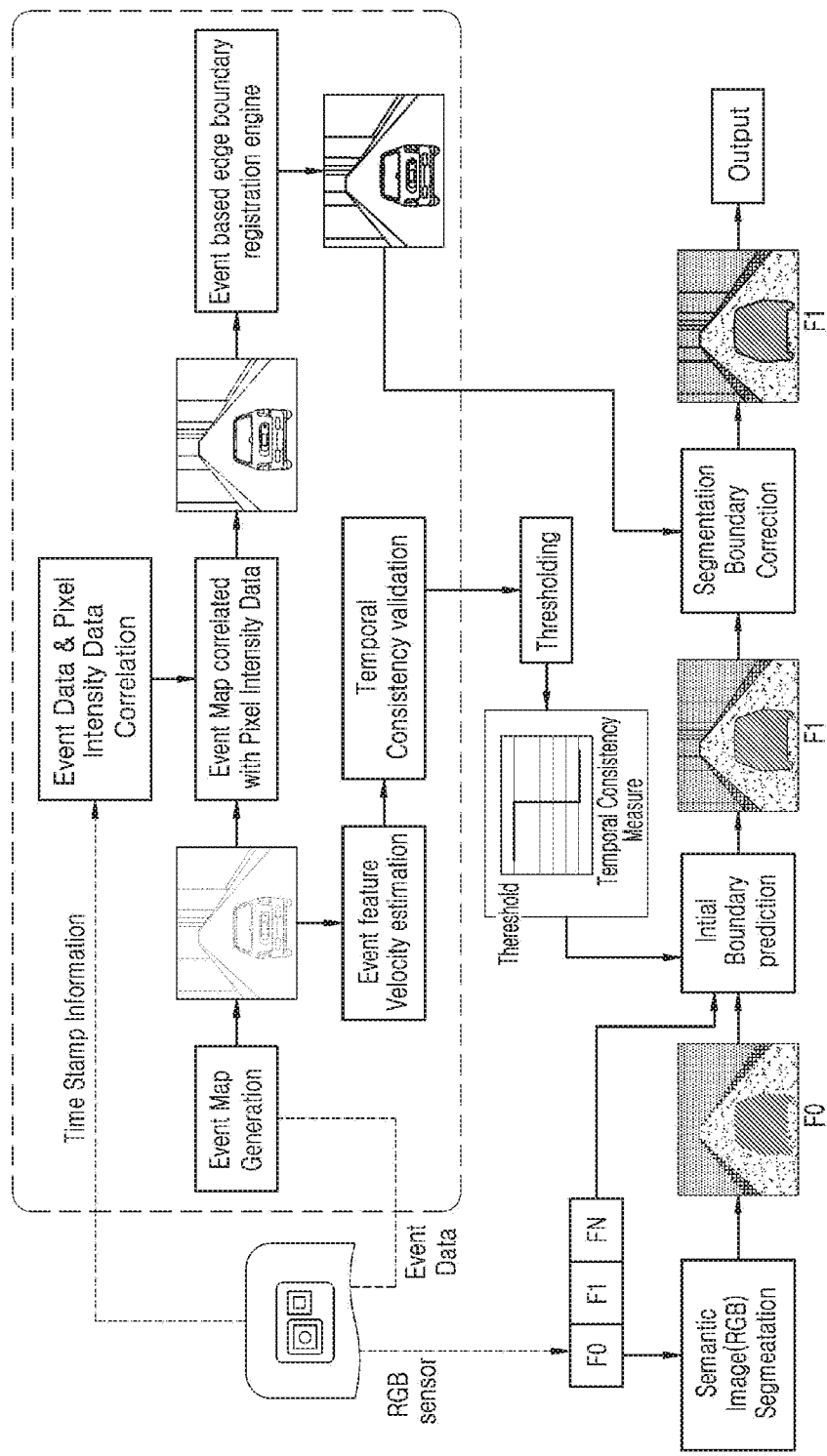
FIG. 5 illustrates a flow diagram for real-time semantic image segmentation using a sensor, according to an embodiment.

FIG. 5 illustrates a flow diagram for real-time semantic image segmentation using a monocular event-based sensor, according to an embodiment.

As an event frame capturing rate is higher than an RGB frame capturing rate, an event map is generated by the accumulation of a plurality of event frames over a defined interval. Further, as the timestamp of pixel intensity data and event data is different, the event data and the pixel intensity are correlated over time with a registered edge boundary map derived from correlated event map and used for predicted boundary corrections. In the first frame F0, RGB based semantic segmentation is applied to F0 to obtain the initial segmentation boundary map. This segmentation boundary map may be tracked in upcoming frames using temporally consistent event frames. The second frame F1 may be semantically segmented based on the initial boundary prediction generated using a semantic label map generated from first frame F0. Accordingly, the coarse level semantic map may be generated. Further, the second frame F1 may be semantically segmented without running through computationally intensive Deep Neural Network (DNN) layers or RGB based semantic segmentation methods.

Accordingly, a computation may be performed fast and make real-time scene analysis/understanding feasible on low power consuming embedded devices.

Figure 6:
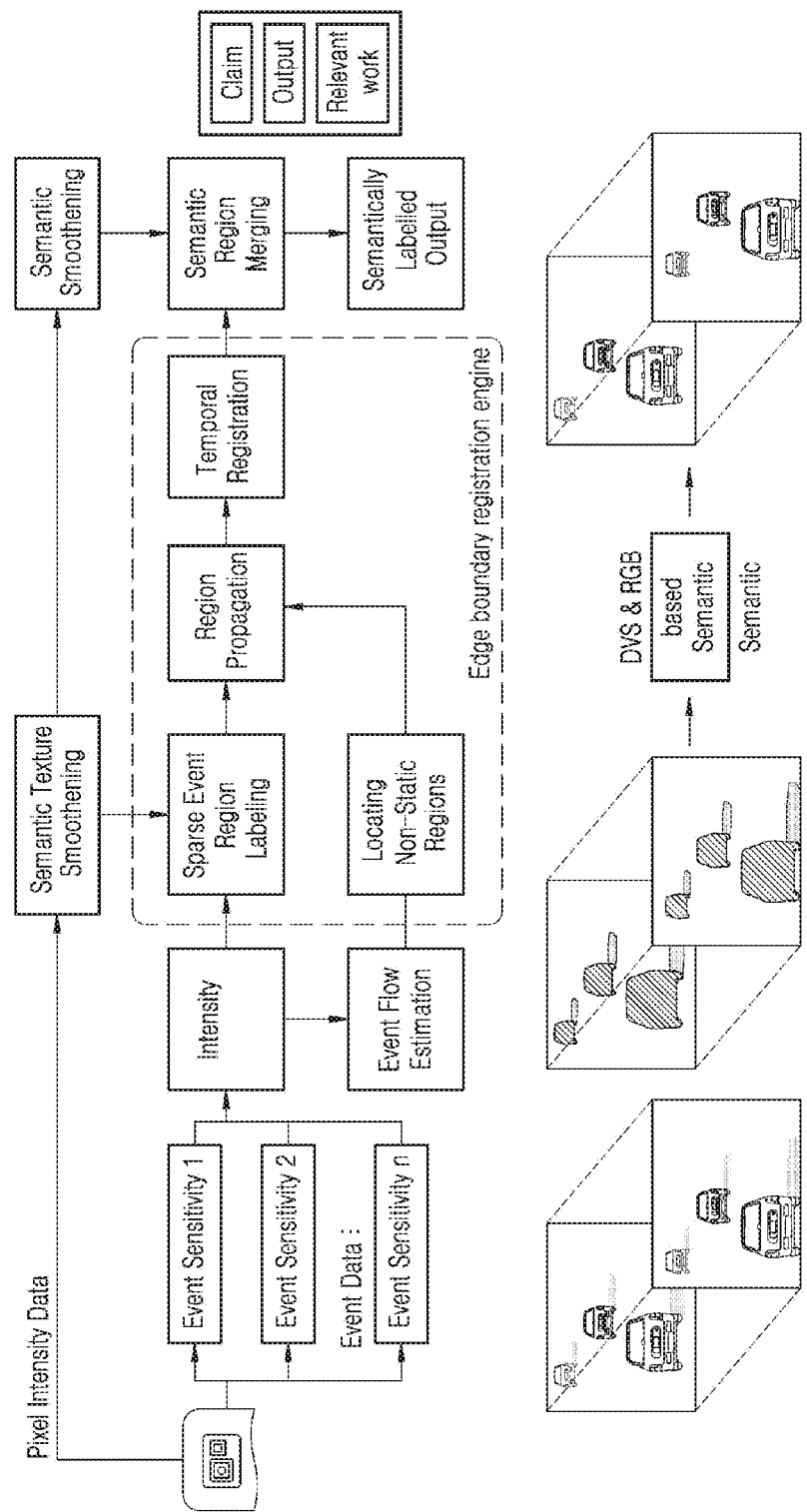
FIG. 6 illustrates a flow diagram for classification and segmentation of shadow region using DVS and RGB based semantic segmentation, according to an embodiment.

FIG. 6 illustrates a flow diagram illustrating the classification and segmentation of the shadow region using Dynamic Visual Sensor (DVS) and Red Green Blue (RGB) based semantic segmentation, according to an embodiment.

Multiple sensitivity levels of the monocular event-based sensor may be used intelligently to filter out effects under various lighting conditions. Further, the spatially inconsistent regions or objects may be identified by varying the exposure control of the monocular event-based sensor. At the optimum exposure control level, the spatially inconsistent regions such as shadow region, foggy region or sunny (very bright) region may disappear in the event map. Further, using inputs from the registered event map, spatially inconsistent regions may be masked in semantically labeled RGB frame and could be used to correct or update the object boundary map in the subsequent frames.

FIG. 7A illustrates a flow diagram for handling local motion using RGB data and event data, according to an embodiment.

Referring to FIG. 7A, non-static regions are identified in the event data and RGB data. The performance of the feature cluster matching and camera pose estimation may be enhanced by using identified non-static regions. Since RGB data (RGB image) may be affected due to motion in a scene, the feature cluster matching and camera pose estimation performed on only RGB image may be prone to errors. For example, the RGB based pose estimation can be erroneous due to other vehicle motion in the scene while a user is approaching. In addition, the image to world co-ordinates mapping with GPS data fusion may be performed accurately. Accordingly, the drift on-preview navigation line may be resolved using RGB data and the event data. Further, on-preview-navigation lines are stable and clearly directed, after drift on the preview navigation line is resolved. Embodiments herein may aid in improving Augmented Reality (AR) navigation experience due to enhanced pose estimation using the RGB data and the event data.

Figure 7B:
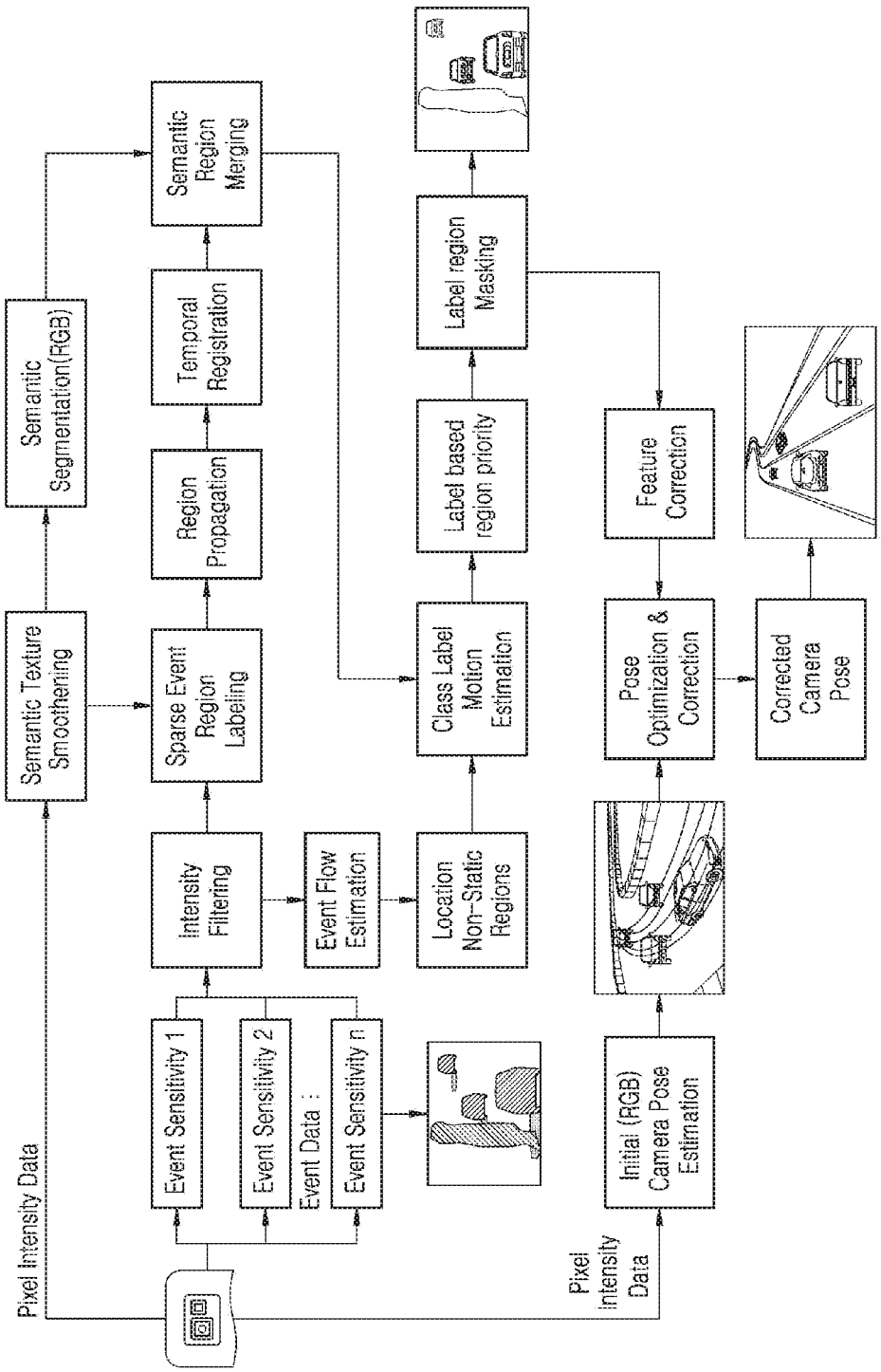
FIG. 7B illustrates a flow diagram for robust scene segmentation and mapping in a scene with local motion, according to an embodiment.

FIG. 7B illustrates a flow diagram for robust scene segmentation and mapping in a scene with local motion, according to an embodiment.

Referring to FIG. 7B, image processing may be performed with RGB semantic segmentation. The camera pose estimation may rely on features in the frames. For example, a sudden change in frames makes the RGB feature detection erroneous and in turn results in inaccurate pose estimation. Accordingly, a feature cluster may be corrected using event data which assists in accurate pose estimation. The identified local motion region may be masked to avoid erroneous feature tracking. The use of the event data to enhance the camera pose estimation may aid in multiple use cases such as AR navigation, on-preview GPS coordinate mapping and so on.

FIG. 7C illustrates the mapping of an image to world coordinate, according to an embodiment.

Referring to FIG. 7C, points 741 in an image may be represented as image coordinate (i.e. x [0: Width], y [0: Height]) local to image, origin [0, 0]. The Global Positioning System (GPS) in image 743 may provide a location of a user in a world coordinate system (i.e. latitude, longitude) in a map view, whereas the map view and the camera preview may be different. The camera preview as shown in image 745 may capture the actual view of the world. The GPS coordinate mapping to camera preview may be referred to as image to world coordinate mapping. The camera pose estimation may be used for mapping the GPS coordinate to the camera preview. In the presence of local motion error, navigation points 747 may be diverted due to the inaccurate camera pose estimation, which results in unstable/discontinuous navigation. The local motion error that may result in inaccurate mapping of image pixels to world coordinate may be corrected as disclosed in the embodiments herein. The corrected local motion error may help to preview stable and precise navigation. Further, the walking path may be notified and/or displayed to move the navigation points to a walking path, to navigate the walking route correctly as shown in image 749.

Figure 8A:
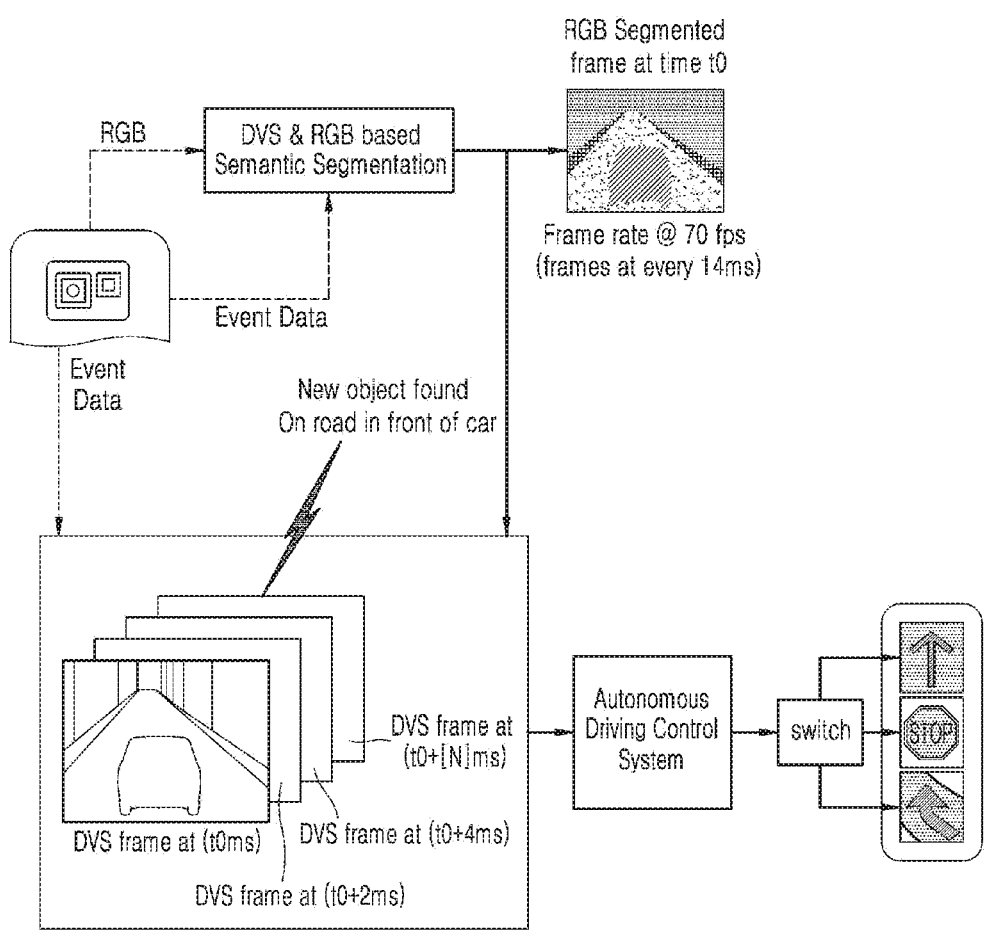
FIG. 8A illustrates an example autonomous driving scenario, according to an embodiment.

FIG. 8A illustrates an example autonomous driving scenario, according to an embodiment.

Referring to FIG. 8A, the semantic labels in the RGB frame may be used to decide important segments (i.e. road in autonomous driving) in the image. An event occurring on the road and nearby area may be tracked using DVS data with high frames per second (fps) rate to detect sudden changes successfully. Accordingly, a high focus on road and nearby areas, the collision avoidance safety system may be always ON. Further, once sudden changes or transitions are detected in the road using the event data and the RGB process takes place along with a safety system (not shown) in the car immediately (within approximately 55 ms from the occurrence of the sudden change). If some obstacles are found within this interval on the road that may be captured by event sensor which generates event data (assuming, for example, event data is updated at every 2 ms), a trigger will be generated to activate the safety system in the car. Accordingly, even if the car does not know what the boundary object is, an emergency decision may be generated by the safety system. For example, the emergency decision could be and not limited to applying the brakes by the safety system in case of a sudden appearance of an obstacle in front of the car that is detected by the event sensor. In addition, the sudden appearance of the obstacle would trigger semantic segmentation for subsequent RGB frames instead of applying boundary prediction for the previous RGB frame semantic segmented output.

Figure 8B:
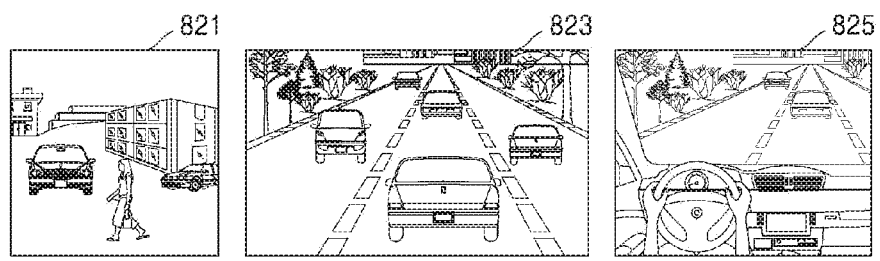
FIG. 8B illustrates an example of safety handling in an autonomous driving scenario, according to an embodiment.

FIG. 8B illustrates an example of safety handling in autonomous driving, according to an embodiment.

In image 821, a pedestrian may suddenly cross the road. The temporal inconsistency on the road region in front of a vehicle detected by a sudden appearance of a pedestrian is tracked. In image 823, fast overtaking of a vehicle is detected. The temporal inconsistency on the road region in front of the vehicle due to a sudden crossing of another vehicle is detected. In image 825, sudden stopping of a car in front of vehicle is tracked and the temporal inconsistency on the road region in front of the vehicle is detected. The safety handling measure includes region-based temporal inconsistency detection on the road region using DVS data. By tracking the movements of events towards the road in front of the vehicle, the electronic device 200 of the vehicle may trigger a safety control system.

In an example, an autonomous vehicle may run at a typical speed of 100 km/H (i.e. 2.8 cm/ms). The semantic segmentation may output up to 70 frames per second. Accordingly, visual frames may be segmented at every [1/70]=14 milliseconds. The maximum switching time from DVS to RGB may be less than 55 milliseconds. In an example, human response time may be 250 ms for visual and 170 ms for audio. During the switch over time (<55 ms) from DVS to RGB, the collision avoidance safety system is tracking the road events or changes at approximately 500 fps for emergency decisions. In another example, if a person appears suddenly in front of a car and the person is running at 10 km/hr, then it may take approximately 200 ms at minimum to appear in front of a car. In the worst case, image segmentation may be possible, for example, by 55 ms the person will be identified as an object using safety system and the object will be labeled as human as well which may be faster than human response time.

Figure 8C:
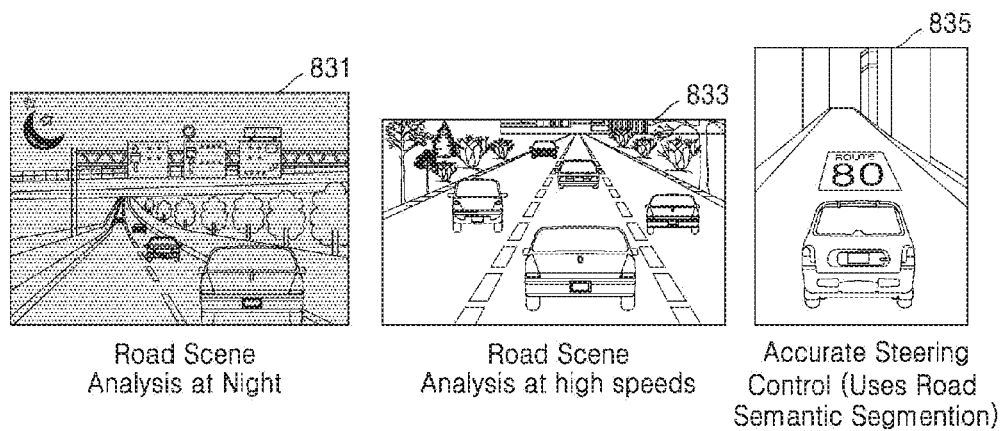
FIG. 8C illustrates an example scenario, where semantic segmentation is performed for an autonomous driving environment, according to an embodiment.

FIG. 8C illustrates an example scenario, where semantic segmentation is performed for the autonomous driving environment, according to an embodiment.

The semantic segmentation delineates the boundaries of the road and all the objects in a scene. The semantic segmentation may aid in autonomous steering control of a vehicle. Due to the multi-sensitivity of DVS, the DVS can detect even changes even at night time in image 831. In an example, the DVS can capture at a high speed of 1000 fps in image 833 and hence may be suitable to capture scene changes on the road for accurate steering control as shown in image 835.

Figure 8D:
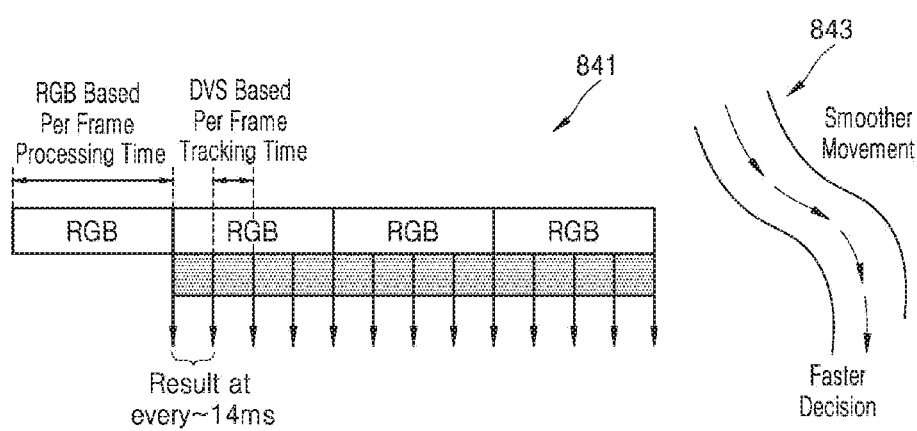
FIG. 8D illustrates an example of frame pipeline diagram, according to an embodiment.

FIG. 8D illustrates an example of a frame pipeline diagram, according to an embodiment.

In an example, assuming that autonomous car run at 100 Km/H, the car may take a decision at every 2.8 cm/ms as shown in frames 841 and the decision update leads to a smoother movement as shown in diagram 843. As the decision rate increases, the car can handle faster event transitions on the road.

Figure 9A:
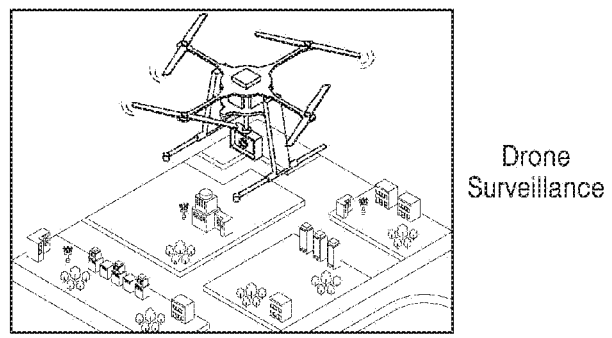
FIG. 9A illustrates an example scenario for visual understanding for drone surveillance, according to an embodiment.
Figure 9A:
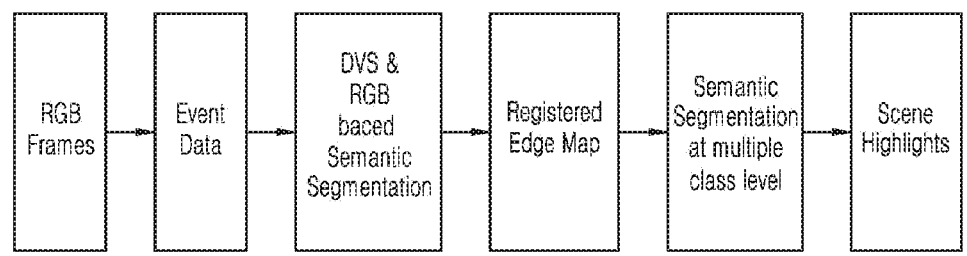

FIG. 9A illustrates an example scenario for visual understanding for drone surveillance, according to an embodiment.

The high frame rate semantic scene understanding using an event sensor may be used in real-time scene understanding approach. The proposed approach using an event sensor in capturing a scene and event changes may also be effectively and efficiently applicable to the UAV to avoid potential obstacles and safe flight.

Figure 9B:
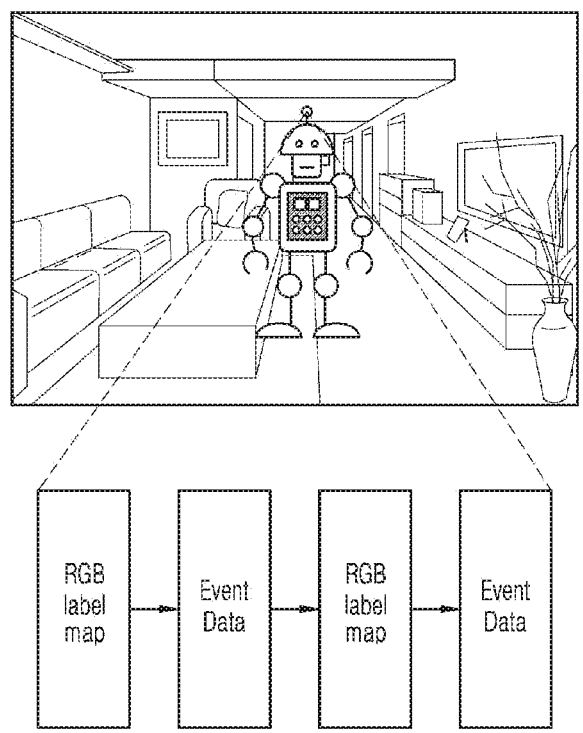
FIG. 9B illustrates an example scenario for visual understanding for a robot, according to an embodiment.

FIG. 9B illustrates an example scenario for visual understanding for a robot, according to an embodiment.

The high frame rate semantic scene understanding using event sensor embedded in a robot may provide, high fps visual understanding at low power with fast response, visual understanding at any light condition, transparent/translucent object recognition.

Figure 9C:
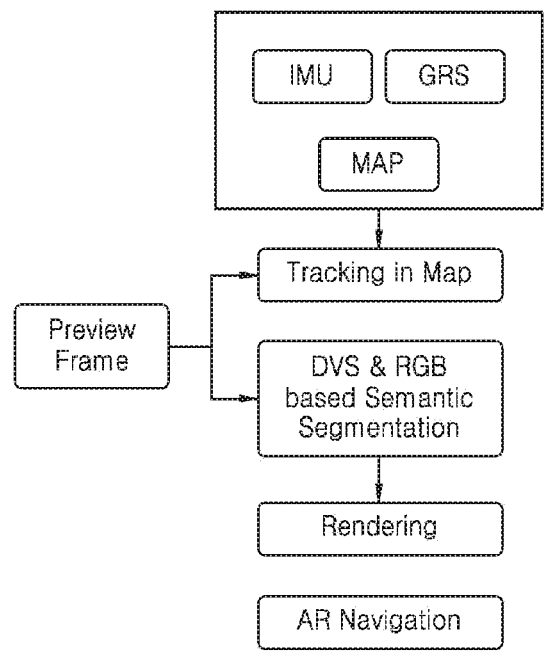
FIG. 9C illustrates an example scenario for visual understanding for Augmented Reality (AR) navigation, according to an embodiment.

FIG. 9C illustrates an example scenario for visual understanding for Augmented Reality (AR) navigation, according to an embodiment.

The high frame rate semantic scene understanding using event sensor may provide high fps scene understanding using low power DVS sensor, real-time navigation experience and on-preview navigation (i.e. real scene). The examples include navigation for a robot, AR glass, mobile, and render the path in the scene to navigate.

Figure 9D:
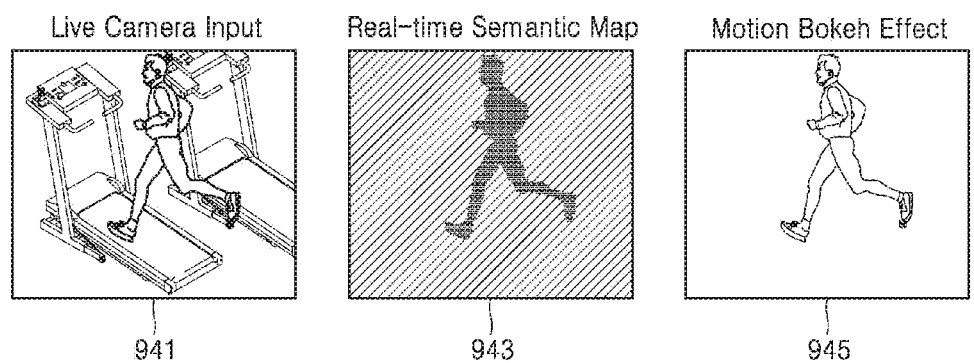
FIG. 9D illustrates an example scenario for motion Bokeh effect, according to an embodiment.

FIG. 9D illustrates an example scenario for motion Bokeh effect, according to an embodiment.

The real-time semantic segmentation may realize the motion Bokeh effect 945 in a mobile device. Also, the class/category-specific effects can also be achieved. Further, the object depth estimation in Infrared (IR) or stereo camera may not be required. Low form factor and/or low power solution may be provided. The motion Bokeh effect 945 can be realized using one or more of a live camera input 941 and a real-time semantic map 943.

Figure 10A:
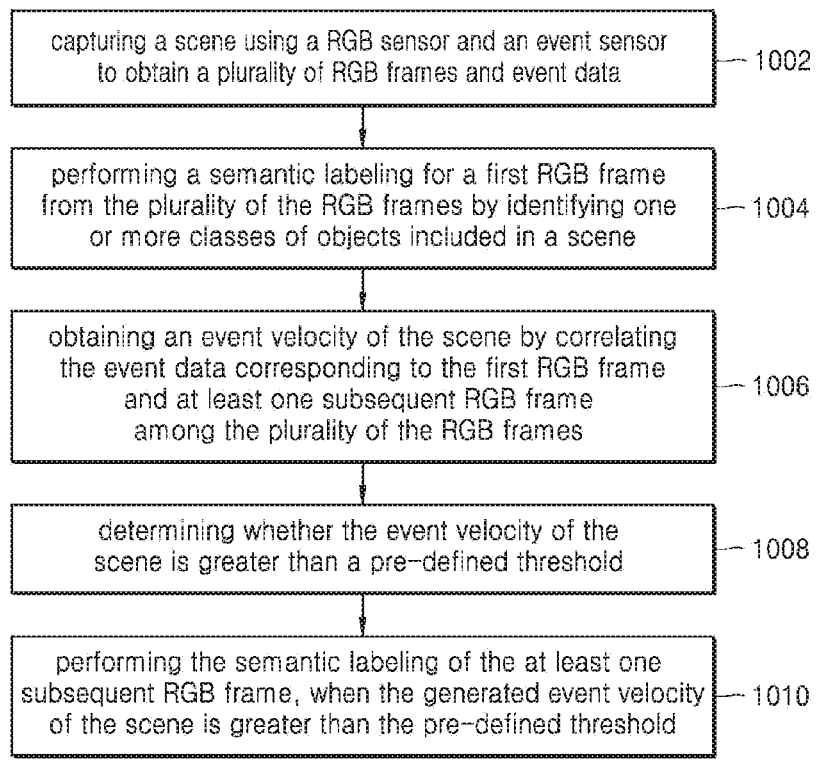
FIG. 10A illustrates a flow chart for real-time semantic image segmentation using an event sensor, according to an embodiment.

FIG. 10A illustrates a flow chart illustrating real-time semantic image segmentation using a sensor, according to an embodiment.

In operation 1002, the sensor of the electronic device 200 captures a scene using an RGB sensor 213 and an event sensor 223. By capturing the scene including objects, the electronic device 200 may obtain a plurality of RGB (Red Green Blue) frames with the RGB sensor 213 and event data with the event sensor 223.

In operation 1004, the processor 201 of the electronic device 200 may perform semantic labeling of a first RGB frame from the plurality of the RGB frames by identifying one or more classes of objects included in the scene. The classes of objects may be classified into, for example, a person, an animal, a tree, a building, a road, a vehicle and so forth.

In operation 1006, the processor 201 may obtain an event velocity of the scene by correlating or fusing the event data corresponding to the first RGB frame and at least one subsequent RGB frame among the plurality of the RGB frames. In operation 1008, the processor 201 may determine whether the generated event velocity of the scene is greater than a pre-defined threshold. In operation 1010, the processor 201 may perform the semantic labeling of the at least one subsequent RGB frame, when the generated event velocity of the scene is greater than the pre-defined threshold.

The various operations illustrated in FIG. 10A may be performed in the order presented, in a different order or simultaneously. Further, in some embodiments, some operations listed in FIG. 10A may be skipped or omitted.

Figure 10B:
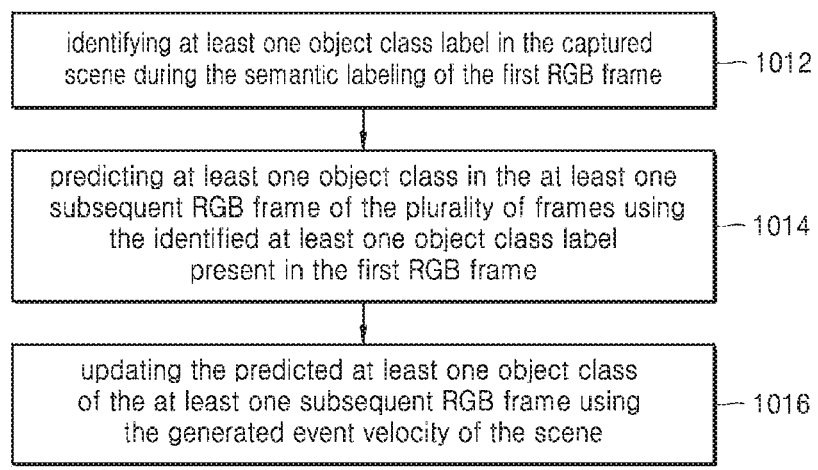
FIG. 10B illustrates a flow chart for updating predicted at least one object class label of the at least one subsequent RGB frame, according to an embodiment.

FIG. 10B illustrates a flow chart for updating the predicted at least one object class label of at least one subsequent RGB frame, according to an embodiment.

In operation 1012, the processor 201 may identify at least one object class label in the captured scene during the semantic labeling of the first RGB frame. In operation 1014, the processor 201 may predict at least one object class in the at least one subsequent RGB frame of the plurality of frames using the identified at least one object class label present in the first RGB frame. In operation 1016, the processor 201 may update the predicted at least one object class of the at least one subsequent RGB frame using the generated event velocity of the scene.

The various operations illustrated in FIG. 10B may be performed in the order presented, in a different order or simultaneously. Further, in some embodiments, some operations listed in FIG. 10B may be skipped or omitted.

Figure 10C:
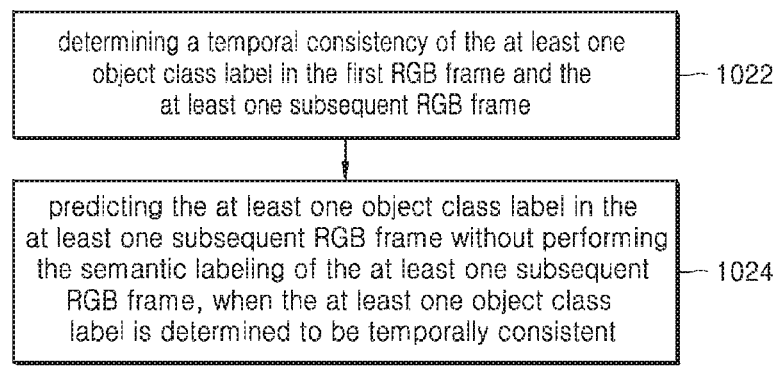
FIG. 10C illustrates a flow chart for predicting the at least one object class label in at least one subsequent RGB frame, according to an embodiment.

FIG. 10C illustrates a flow chart for predicting the at least one object class label in at least one subsequent RGB frame, according to an embodiment.

In operation 1022, the processor 201 may determine a temporal consistency of the at least one object class label in the first RGB frame and the at least one subsequent RGB frame. In an embodiment, the at least one object class label is determined to be temporally consistent when the generated event velocity is below the pre-defined threshold. In operation 1024, the processor 201 may predict the at least one object class label in the at least one subsequent RGB frame without performing the semantic labeling of the at least one subsequent RGB frame, when the at least one object class label is determined to be temporally consistent.

The various operations illustrated in FIG. 10C may be performed in the order presented, in a different order or simultaneously. Further, in some embodiments, some operations listed in FIG. 10C may be skipped or omitted.

FIG. 10D illustrates a flow chart for obtaining the event data of the scene at a plurality of multiple sensitivity levels, according to an embodiment.

In operation 1030, the processor 201 may generate the event data of the scene at a plurality of multiple sensitivity levels using the event sensor 223 configured to capture a scene. In an embodiment, the event data is generated by changing or controlling the exposure value of the event sensor 223.

The various operations illustrated in FIG. 10D may be performed in the order presented, in a different order or simultaneously. Further, in some embodiments, some operations listed in FIG. 10D may be skipped or omitted.

Figure 10E:
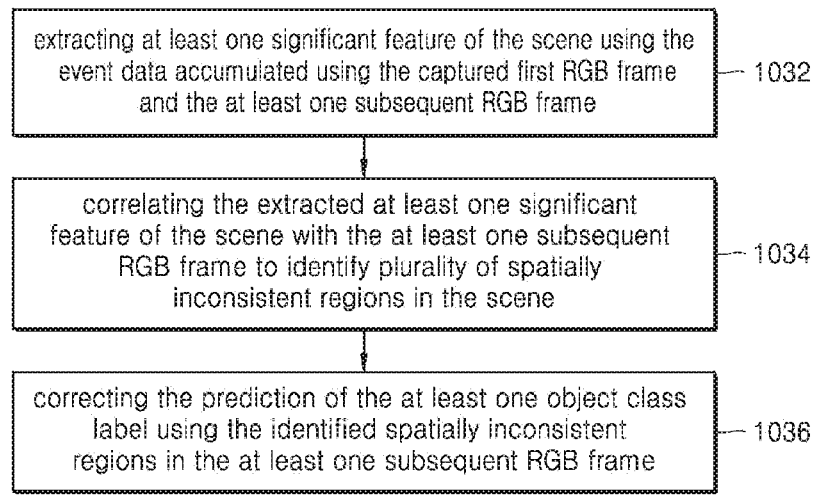
FIG. 10E illustrates a flow chart for correcting a prediction of the at least one object class label of the identified spatially inconsistent regions in the at least one subsequent RGB frame, according to an embodiment.

FIG. 10E illustrates a flow chart for correcting a prediction of the at least one object class label of the identified spatially inconsistent regions in the at least one subsequent RGB frame, according to an embodiment.

In operation 1032, the processor 201 may extract at least one significant feature of the scene using the event data accumulated using the captured first RGB frame and the at least one subsequent RGB frame. In operation 1034, the processor 201 may correlate or fuse the extracted at least one significant feature of the scene with at least one subsequent RGB frame to identify a plurality of spatially inconsistent regions in the scene. In operation 1036, the processor 201 may correct the prediction of the at least one object class label using the identified spatially inconsistent regions in the at least one subsequent RGB frame.

The various operations illustrated in FIG. 10E may be performed in the order presented, in a different order or simultaneously. Further, in some embodiments, some operations listed in FIG. 10E may be skipped or omitted.

Figure 10F:
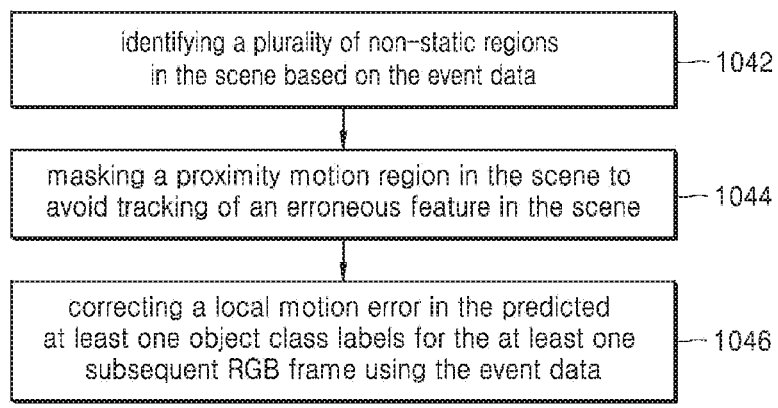
FIG. 10F illustrates a flow chart for correcting a local motion error in the predicted at least one object class labels for the at least one subsequent RGB frame, according to an embodiment.

FIG. 10F illustrates a flow chart for correcting a local motion error in the predicted at least one object class labels for the at least one subsequent RGB frame, according to an embodiment.

In operation 1042, the processor 201 may identify a plurality of non-static regions in the scene based on the event data. In operation 1044, the processor 201 may mask a proximity motion region in the scene to avoid tracking of an erroneous feature in the scene. In operation 1046, the processor 201 may correct a local motion error in the predicted at least one object class labels for the at least one subsequent RGB frame using the event data.

The various operations illustrated in FIG. 10F may be performed in the order presented, in a different order or simultaneously. Further, in some embodiments, some operations listed in FIG. 10F may be skipped or omitted.

Figure 10G:
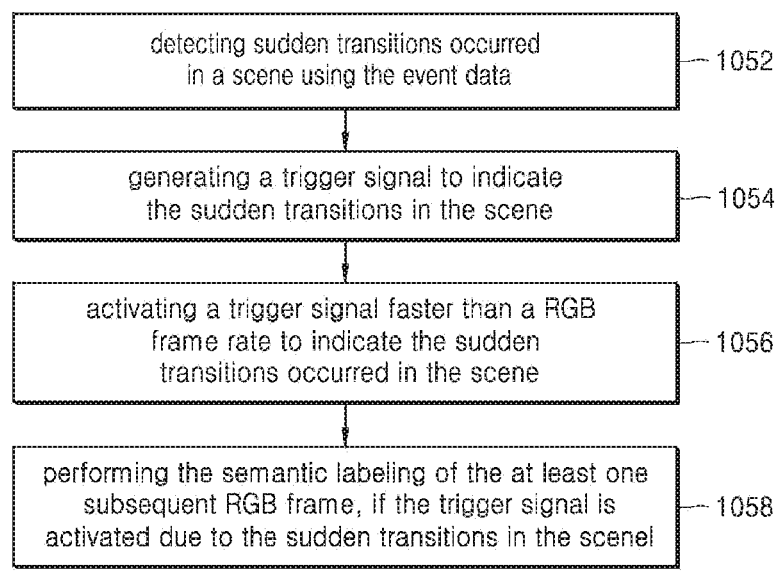
FIG. 10G illustrates a flow chart for performing semantic labeling of the at least one subsequent RGB frame, according to an embodiment.

FIG. 10G illustrates a flow chart for performing the semantic labeling of the at least one subsequent RGB frame, according to an embodiment.

In operation 1052, the processor 201 may detect sudden transitions occurred in a scene using the event data. In operation 1054, the processor 201 may generate a trigger signal to indicate the sudden transitions in the scene. In operation 1056, the processor 201 may activate a trigger signal faster than an RGB frame rate to indicate the sudden transitions occurred in the scene. In operation 1058, the processor 201 may perform the semantic labeling of the at least one subsequent RGB frame, if the trigger signal is activated due to the sudden transitions in the scene.

The various operations illustrated in FIG. 10G may be performed in the order presented, in a different order or simultaneously. Further, in some embodiments, some operations listed in FIG. 10G may be skipped or omitted.

Figure 10H:
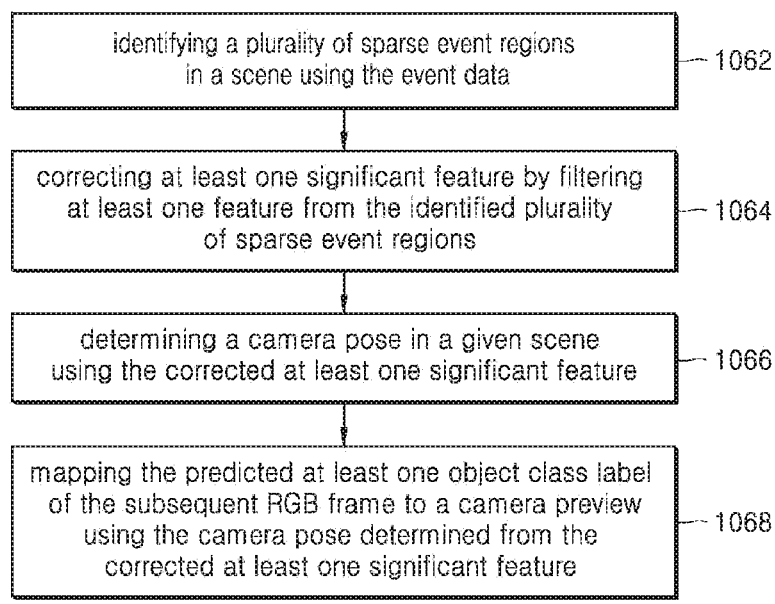
FIG. 10H illustrates a flow chart for mapping predicted semantic label to a camera preview, according to an embodiment.

FIG. 10H illustrates a flow chart for mapping the predicted semantic label to a camera preview, according to an embodiment.

In operation 1062, the processor 201 may identify a plurality of sparse event regions in a scene using the event data. In operation 1064, the processor 201 may correct at least one significant feature by filtering at least one feature from the identified plurality of sparse event regions. In operation 1066, the processor 201 may determine a camera pose in a given scene using the corrected at least one significant feature. In operation 1068, the processor 201 may map the predicted at least one object class label of the subsequent RGB frame to a camera preview using the camera pose determined from the corrected at least one significant feature.

The various operations illustrated in FIG. 10H may be performed in the order presented, in a different order or simultaneously. Further, in some embodiments, some operations listed in FIG. 10H may be skipped or omitted.

Figure 11:
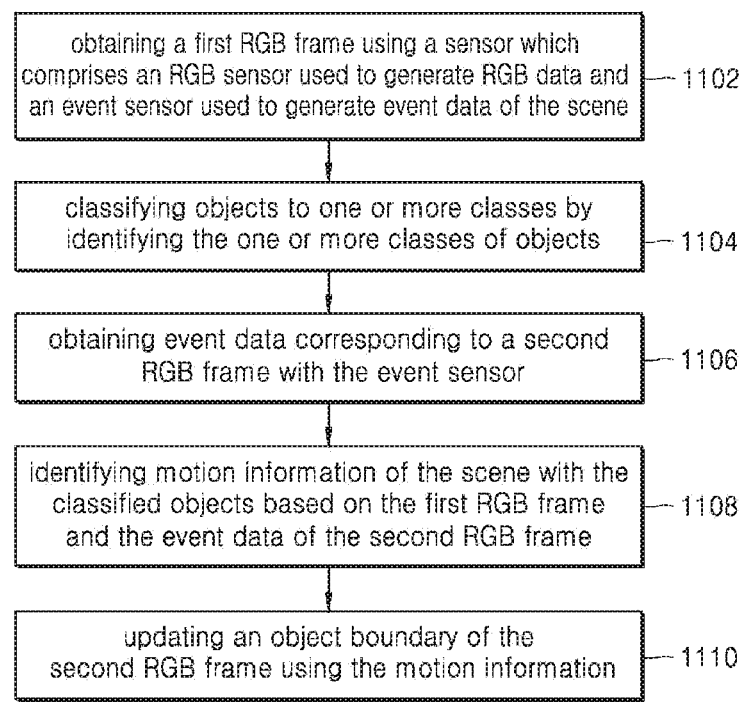
FIG. 11 illustrates a flow chart for image segmentation using a sensor, according to an embodiment.

FIG. 11 illustrates a flow chart for image segmentation using a sensor, according to an embodiment. The image segmentation may be semantic segmentation using the sensor.

In operation 1102, the electronic device 200 may obtain a first RGB frame using a sensor 203 which includes an RGB sensor 213 used to generate RGB data and an event sensor 223 used to generate event data by capturing a scene. The event data may be associated with motions of objects included in the scene.

The processor 201 may perform object labeling—semantic labeling—with the first RGB frame by identifying one or more classes of objects in the scene in operation 1104. That is, the processor 201 may classify objects in the scene into one or more classes such as a human, an animal, a tree, a building, a car, a bicycle and so forth, by identifying the one or more classes of objects in the scene. The event data may be associated with motions of the objects or changes of edges of the objects. In an embodiment, the event data may be updated with events which are detected by changes of pixel intensity in an image of the scene. The events may be accumulated over a period of time and the accumulated events may be correlated or fused with RGB frames. In an embodiment, the processor 201 may generate an event velocity with changes in the accumulated events, determine whether the event velocity is greater than a predefined threshold value, and classify the objects included in the scene to one or more classes based on the determination.

The processor 201 may obtain event data of a second RGB frame via the event sensor 223 in operation 1106. The event data of the second RGB frame may be obtained at various sensitivity levels by changing the exposure value of the event sensor 223. In an embodiment, the processor 201 can determine an optimum sensitivity level of the event sensor among multiple sensitivity levels to identify spatially inconsistent regions such as shadow based on the event data including the accumulated events.

In operation 1108, the processor 201 may identify motion information of the scene with the classified objects in the scene based on the first RGB frame and the event data of the second RGB frame. The motion information may be identified or updated with the accumulated events.

In operation 1110, the processor 201 may update an object boundary for the second RGB frame using the motion information.

In an embodiment, the processor 201 may predict the object boundary of the second RGB frame using one or more classes of the objects in the scene.

In an embodiment, the processor 201 may identify spatially inconsistent regions in the scene based on the motion information and control to mask the spatially inconsistent region in the scene.

The embodiments disclosed herein can be implemented through at least one software program running on at least one hardware device and performing network management functions to control the elements. The elements shown in FIG. 2 can be at least one of a hardware device or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for image segmentation in an electronic device, the method comprising:
    obtaining a first RGB frame of a scene using a sensor, the sensor comprising:
        a red, green, blue (RGB) sensor generating RGB data, and
        an event sensor generating event data corresponding to the first RGB frame;
    classifying objects in the scene to one or more classes of objects by identifying the one or more classes of objects in the scene;
    obtaining event data corresponding to a second RGB frame with the event sensor at multiple sensitivity levels by changing exposure values of the event sensor;
    identifying motion information of the scene with the classified objects based on the first RGB frame and the event data of the second RGB frame;
    predicting an object boundary of the second RGB frame using the one or more classes of objects in the scene; and
    estimating the object boundary for the second RGB frame using the motion information.

2. The method of claim 1, wherein the event data of the scene is associated with motions of objects in the scene.

3. The method of claim 1, wherein the event data is updated with events that are detected by changes of pixel intensity in an image of the scene.

4. The method of claim 3, further comprising:
    accumulating the events over a period of time; and
    correlating the accumulated events with RGB frames including the first RGB frame and the second RGB frame.

5. The method of claim 4, further comprising:
    determining an optimum sensitivity level of the event sensor among multiple sensitivity levels to identify spatially inconsistent regions based on the event data including the accumulated events.

6. The method of claim 4, wherein the identifying of the motion information comprises identifying the motion information of the scene with the accumulated events.

7. The method of claim 4, wherein the classifying of the objects in the scene to the one or more classes of objects comprises:
    generating an event velocity of the scene with changes in the accumulated events;
    determining whether the event velocity is greater than a predefined threshold value; and
    classifying the objects in the scene to the one or more classes of objects in response to the determination.

8. The method of claim 1, further comprising:
    identifying spatially inconsistent regions in the scene in response to obtaining the event data by changing sensitivity levels of the event sensor; and
    masking the identified spatially inconsistent regions in an image of the scene.

9. The method of claim 1, wherein the identifying of the motion information of the scene comprises identifying the motion information of the scene by detecting changes in the object boundary with the event data of the second RGB frame.

10. The method of claim 1, wherein the event sensor captures the scene at a higher frame rate than the RGB sensor.

11. A method for image segmentation in an electronic device, the method comprising:
    capturing a scene using a red, green, blue (RGB) sensor to obtain a plurality of RGB frames and an event sensor to obtain event data corresponding to each of the plurality of RGB frames;
    performing object labeling for objects in a first RGB frame among the plurality of RGB frames by identifying one or more object classes;
    obtaining an event velocity of the scene by fusing the event data corresponding to the first RGB frame and at least one subsequent RGB frame among the plurality of RGB frames;
    determining whether the event velocity is greater than a predefined threshold; and
    performing object labeling for objects in the at least one subsequent RGB frame based on the determination,
    wherein the performing of the object labeling comprises classifying the objects into the one or more object classes.

12. The method of claim 11, further comprising:
    identifying at least one object class in the captured scene during the performing of the object labeling for the objects in the first RGB frame;
    predicting at least one object class in the at least one subsequent RGB frame using the at least one object labeling in the first RGB frame; and
    updating the at least one object class of the at least one subsequent RGB frame using the event velocity of the scene.

13. The method of claim 12, further comprising:
    extracting at least one feature from the scene using the event data accumulated with the first RGB frame and the at least one subsequent RGB frame;
    correlating the at least one feature with the at least one subsequent RGB frame to identify spatially inconsistent regions in the scene; and
    correcting the prediction of the at least one object class using the spatially inconsistent regions.

14. The method of claim 13, wherein the extracting of the at least one feature comprises extracting the at least one feature using the event data obtained at different sensitivity levels of the event sensor.

15. The method of claim 11, further comprising:
    generating the event data at a plurality of sensitivity levels by changing exposure values of the event sensor.

16. An apparatus for image segmentation, the apparatus comprising:
- a sensor unit configured to obtain a first red, green, blue (RGB) frame of a scene, the sensor unit comprising:
  - an RGB sensor configured to generate RGB data, and
  - an event sensor configured to generate event data of the first RGB frame and a second RGB frame, wherein the event sensor is configured to obtain the second RGB frame at multiple sensitivity levels by changing exposure values of the event sensor; and
- a processor configured to:
  - classify objects in the scene to one or more classes of objects by identifying the one or more classes of objects in the scene,
  - identify motion information of the scene with the classified objects based on the first RGB frame and the event data of the second RGB frame;
  - predict an object boundary of the second RGB frame using the one or more classes of objects in the scene; and
  - estimate the object boundary for the second RGB frame using the motion information.

17. The apparatus of claim 16, wherein the processor is configured to:
- identify spatially inconsistent regions in the scene in response to obtaining the event data by changing sensitivity levels of the event sensor, and
- control to mask the identified spatially inconsistent regions in an image of the scene.

* * * * *